US012289367B2

(12) United States Patent
Ogawa

(10) Patent No.: US 12,289,367 B2
(45) Date of Patent: Apr. 29, 2025

(54) IN-VEHICLE/OUT-VEHICLE COOPERATION DEVICE AND METHOD

(71) Applicant: Sumitomo Electric Industries, Ltd., Osaka (JP)

(72) Inventor: Akihiro Ogawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 170 days.

(21) Appl. No.: 17/798,571

(22) PCT Filed: Jan. 18, 2021

(86) PCT No.: PCT/JP2021/001460
§ 371 (c)(1),
(2) Date: Aug. 10, 2022

(87) PCT Pub. No.: WO2021/171828
PCT Pub. Date: Sep. 2, 2021

(65) Prior Publication Data
US 2023/0115290 A1    Apr. 13, 2023

(30) Foreign Application Priority Data
Feb. 27, 2020 (JP) ................................. 2020-031119

(51) Int. Cl.
*H04L 67/1095* (2022.01)
*B60W 60/00* (2020.01)
(Continued)

(52) U.S. Cl.
CPC ....... *H04L 67/1095* (2013.01); *B60W 60/001* (2020.02); *G08G 1/0104* (2013.01); *H04L 67/12* (2013.01); *B60W 2556/45* (2020.02)

(58) Field of Classification Search
CPC ......... H04W 4/40; H04W 4/38; H04W 4/021; B60W 60/001; B60W 2556/45; G08G 1/0104; H04L 67/1095; H04L 67/12
See application file for complete search history.

(56) References Cited

U.S. PATENT DOCUMENTS 9,906,978 B1    2/2018  Yunoki et al.
11,099,561 B1 * 8/2021  Kentley-Klay ...... G05D 1/0061
(Continued)

FOREIGN PATENT DOCUMENTS

CN    106961473 A    7/2017
CN    107731001 A    2/2018
(Continued)

*Primary Examiner* — Hunter B Lonsberry
*Assistant Examiner* — Henry R Hinton
(74) *Attorney, Agent, or Firm* — XSENSUS LLP

(57) ABSTRACT

An in-vehicle/out-vehicle cooperation device includes a data receiving unit configured to receive sensor data from the plurality of sensors via an in-vehicle network, an inter-end delay time estimation unit configured to estimate a transmission delay time of sensor data between ends from each of the plurality of sensors to a predetermined device communicable by a wireless communication device, a value determination unit configured to determine a value of sensor data output from the plurality of sensors based on a state of the vehicle and states of the plurality of sensors, and a selection unit configured to select a part of the sensor data based on transmission delay time estimated by the delay time estimation unit and the value determined by the value determination unit, and transmit a copy of the selected sensor data to the predetermined device via the wireless communication device.

13 Claims, 22 Drawing Sheets

(51) Int. Cl.
*G08G 1/01* (2006.01)
*H04L 67/12* (2022.01)

(56) References Cited

U.S. PATENT DOCUMENTS

| | | | |
|---|---|---|---|
| 11,187,793 B1 * | 11/2021 | Liu | G05D 1/0214 |
| 2011/0279251 A1 | 11/2011 | Yamada | |
| 2016/0253394 A1 * | 9/2016 | Elias | H04L 67/12 |
| | | | 707/719 |
| 2018/0047287 A1 * | 2/2018 | Shimotsuma | G06V 20/58 |
| 2019/0239155 A1 | 8/2019 | Ushida et al. | |
| 2019/0280954 A1 * | 9/2019 | Volos | G06N 7/01 |
| 2020/0333447 A1 * | 10/2020 | Cardei | G01S 17/10 |

FOREIGN PATENT DOCUMENTS

| | | | | |
|---|---|---|---|---|
| JP | 2008263580 A | * | 10/2008 | |
| JP | 2011-22713 A | | 2/2011 | |
| JP | 2012-054887 A | | 3/2012 | |
| JP | 2018-18284 A | | 2/2018 | |
| JP | 2018-67864 A | | 4/2018 | |
| JP | 2018-73389 A | | 5/2018 | |
| JP | 2018073389 A | * | 5/2018 | G06F 16/22 |
| JP | 2020-95503 A | | 6/2020 | |
| WO | 2010/092664 A1 | | 8/2010 | |

\* cited by examiner

FIG. 9

| ID | RESOLUTION/COMPRESSION RATE (LiDAR, MILLIMETER WAVE RADER, CAMERA) | DATA INTERVAL [fps] (LiDAR, MILLIMETER WAVE RADER, CAMERA) | NUMBER OF SENSORS (LiDAR, MILLIMETER WAVE RADER, CAMERA) |
|---|---|---|---|
| 0 | UNCOMPRESSION, UNCOMPRESSION, SD IMAGE | 5.5, 5, - | 4, 4, 0 |
| 1 | UNCOMPRESSION, UNCOMPRESSION, SD IMAGE | 10, 10, - | 4, 4, 0 |
| 2 | UNCOMPRESSION, UNCOMPRESSION, SD IMAGE | 10, 10, 3 | 4, 4, 4 |
| 3 | UNCOMPRESSION, UNCOMPRESSION, HD IMAGE | 10, 10, 3 | 4, 4, 2 |
| 4 | UNCOMPRESSION, UNCOMPRESSION, SD IMAGE | 10, 10, 10 | 4, 4, 4 |
| 5 | UNCOMPRESSION, UNCOMPRESSION, FULL HD IMAGE | 10, 10, 3 | 4, 4, 1 |
| 6 | UNCOMPRESSION, UNCOMPRESSION, HD IMAGE | 10, 10, 10 | 4, 4, 2 |
| 7 | UNCOMPRESSION, UNCOMPRESSION, FULL HD IMAGE | 10, 10, 10 | 4, 4, 3 |

| SENSOR | |
|---|---|
| MILLIMETER WAVE #0 | 0 |
| MILLIMETER WAVE #1 | 1 |
| MILLIMETER WAVE #2 | 2 |
| MILLIMETER WAVE #3 | 3 |
| LiDAR#0 | 4 |
| LiDAR#1 | 5 |
| LiDAR#2 | 6 |
| LiDAR#3 | 7 |
| CAMERA #2 | 8 |
| CAMERA #3 | 9 |

FIG. 11

| SENSOR TYPE | SENSOR TYPE NUMBER |
|---|---|
| MILLIMETER WAVE RADAR | 0 |
| LiDAR | 1 |
| CAMERA | 2 |

FIG. 12

| SENSOR POSITION TYPE | SENSOR POSITION TYPE NUMBER |
|---|---|
| FRONT | 0 |
| REAR | 1 |
| LEFT | 0 |
| RIGHT | 1 |

IN-VEHICLE/OUT-VEHICLE COOPERATION DEVICE AND METHOD

CROSS-REFERENCE TO RELATED APPLICATIONS

The present application is based on PCT/JP2021/001460, filed Jan. 18, 2021, which claims priority to Japanese Application No. 2020-031119, filed on Feb. 27, 2020, the entire contents of each are incorporated herein by reference

TECHNICAL FIELD

The present disclosure relates to an in-vehicle/out-vehicle cooperation device and method.

BACKGROUND ART

When a vehicle is operated, it is necessary to pay sufficient attention not only to movement of a host vehicle but also to movement of other vehicles. Particular attention is required when a pedestrian is present in addition to a vehicle. Conventionally, as illustrated in FIG. 1, there is a technique of detecting a moving object (hereinafter, referred to as a "moving body") present in such a real space 50 by a large number of sensors such as a light detection and ranging (LiDAR) and a camera, estimating an attribute (adults, children, vehicle, two-wheeled vehicle, etc.) thereof, and creating a traffic situation bird's-eye view map 52 using high-definition road map data (hereinafter, referred to as a "high definition map") prepared in advance on a virtual space.

In order to create such a traffic situation bird's-eye view map 52, it is necessary to collect sensor data, which is an output of a large number of sensors, from a vehicle on which the sensors are mounted and an infrastructure sensor such as a camera provided on a road side. For this purpose, it is considered to use a fifth generation mobile communication system (so-called "5G"). An example of such a technique is disclosed in Patent Literature 1 described later.

As an example of 5G, FIG. 2 illustrates a communications system 70 including a first slice to a fourth slice.

Referring to FIG. 2, the first slice includes vehicles 82 and 84 on which in-vehicle devices 92 and 94 capable of 5G wireless communication are mounted, an infrastructure camera 88 including a wireless communication device 98, a traffic signal controller 90 provided on a traffic light and including a wireless communication device 100, a mobile phone 96 possessed by a pedestrian 86, and the like, and is a slice defined to enable direct communication therebetween.

The second slice includes a plurality of base stations 110, 112, and 114, and is a slice defined so that a communication terminal included in the first slice communicates therewith.

The third slice includes metro networks (NWs) 120 and 122, and edge servers 126 and 128 and the like provided in distributed data centers (DCs) 124 and 130 and the like connected to the metro NWs, and is a slice defined so that each communication terminal can communicate therewith via base stations 110, 112, and 114 and the like. Note that the metro NW refers to a communication network constructed to connect buildings, social facilities, houses, and the like within a limited range for each city or the like, for example. Each of the base stations 110, 112, and 114, and the like is connected to any one of edge servers such as the edge servers 126 and 128. Since the edge servers 126 and 128 and the like are servers that are located on the outermost side among the systems connected by the network and connect between a network system and others, the edge servers 126 and 128 and the like are called like that.

The fourth slice includes a core NW 140 communicable with a plurality of metro networks, and a core server 144 provided in a core DC 142 connected to the core NW 140 can communicate with a communication device connected to each metro network such as the edge servers 126 and 128.

Normally, the above-described traffic situation bird's-eye view map is constructed and maintained for a specific range in the edge server 128 or the like. Each communication terminal belonging to the first slice transmits sensor data or the like detected by sensors included in the communication terminals to, for example, the edge server 126. The edge server 126 reconstructs an actual situation on a road on a virtual space by integrating the sensor data, and creates and maintains the traffic situation bird's-eye view map 52. The edge server 126 transmits information for assisting driving or the like to each communication terminal based on the traffic situation bird's-eye view map 52 maintained in this manner.

CITATION LIST

Patent Literature

Patent Literature 1: Japanese Laid-Open Patent Publication No. 2018-018284
Patent Literature 2: Japanese Laid-Open Patent Publication No. 2008-263580
Patent Literature 3: Japanese Laid-Open Patent Publication No. 2018-073389

SUMMARY OF THE INVENTION

According to a first aspect of the present disclosure, an in-vehicle/out-vehicle cooperation device used in a vehicle including an in-vehicle network for data transmission, a wireless communication device that wirelessly communicates data with an out-vehicle, and a plurality of sensors includes a data receiving unit configured to receive sensor data from the plurality of sensors via the in-vehicle network, an inter-end delay time estimation unit configured to estimate a transmission delay time of the sensor data between ends from each of the plurality of sensors to a predetermined device communicable by the wireless communication device, a value determination unit configured to determine a value of sensor data output from the plurality of sensors based on a state of the vehicle and states of the plurality of sensors, and a selection unit configured to select a part of the sensor data based on the transmission delay time estimated by the delay time estimation unit and the value determined by the value determination unit, and transmit a copy of the selected sensor data to the predetermined device via the wireless communication device.

According to a second aspect of the present disclosure, an in-vehicle/out-vehicle cooperation method of cooperating an in-vehicle and an out-vehicle by transmitting sensor data from a plurality of sensors to a predetermined external device in a vehicle including the in-vehicle network for data transmission, a wireless communication device that wirelessly communicates data with the out-vehicle, and the plurality of sensors includes receiving sensor data from a plurality of sensors mounted on a vehicle via an in-vehicle network by a computer, estimating a transmission delay time of the sensor data between ends from the sensor to a predetermined device communicable by the wireless communication device by the computer, determining a value of sensor data output from the plurality of sensors based on a state of the vehicle and states of the plurality of sensors by the computer, and selecting a part of the sensor data based on the transmission delay time estimated in the estimating of the transmission delay time and the value determined by the determining of the value, and transmitting a copy of the selected sensor data to the predetermined device via the wireless communication device by the computer.

The technical scope and contents of the present disclosure will become apparent by reviewing the detailed description of the present disclosure with reference to the accompanying drawings.

BRIEF DESCRIPTION OF DRAWINGS

FIG. 9 is a diagram illustrating an example of stored contents of a sensor data set table illustrated in FIG. 8.

FIG. 10 is a diagram illustrating an example of a sensor priority policy table illustrated in FIG. 8.

FIG. 11 is a diagram illustrating a correspondence relationship between a sensor type and a sensor type number in a table format, in the vehicle according to the first embodiment.

FIG. 12 is a diagram illustrating a correspondence relationship between a sensor position type indicating a position of a sensor mounted on a vehicle and a sensor position type number in a table format.

DETAILED DESCRIPTION

Figure 1:
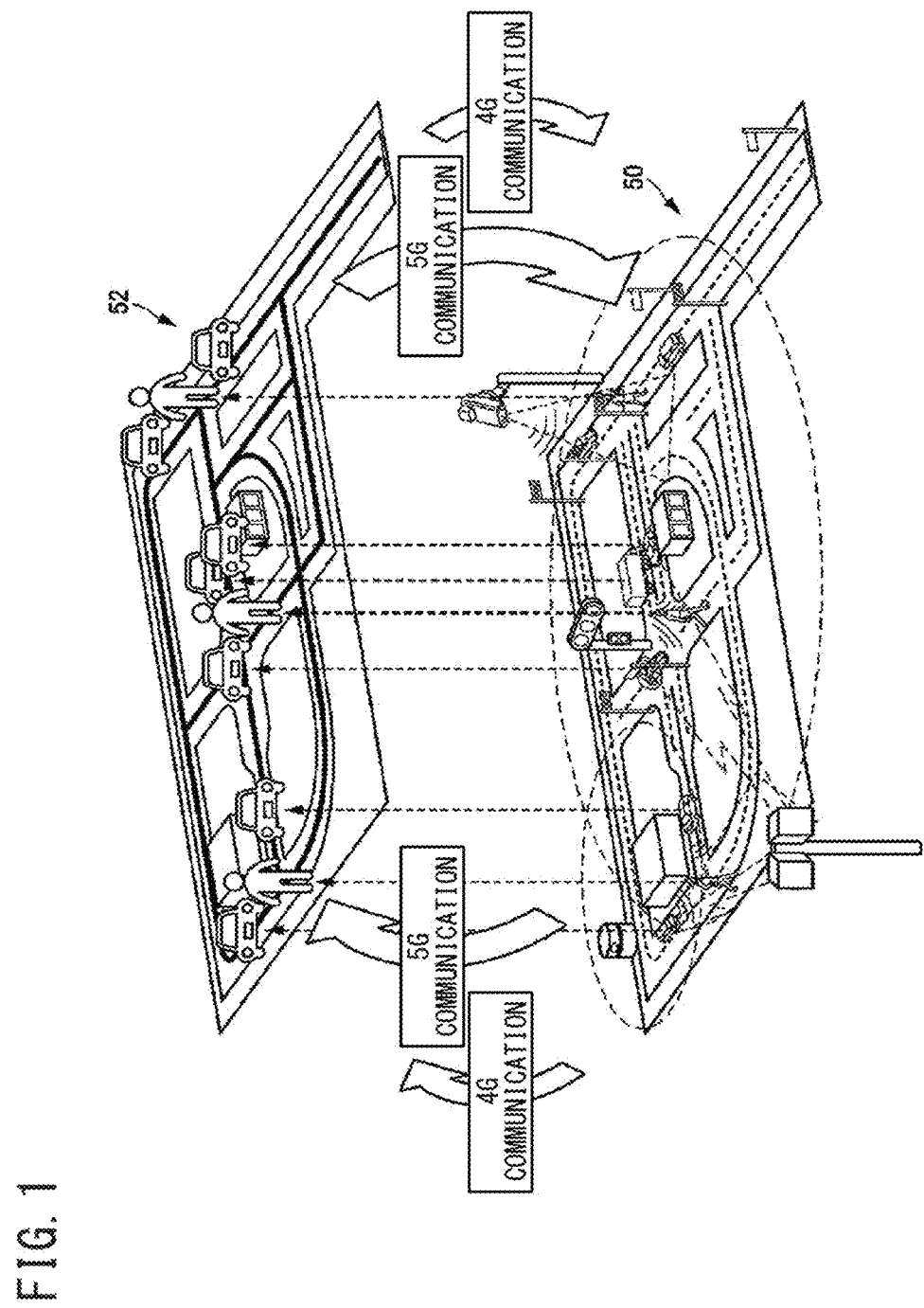
FIG. 1 is a diagram schematically illustrating a relationship between an actual road situation and a road situation bird's-eye view map.
Figure 2:
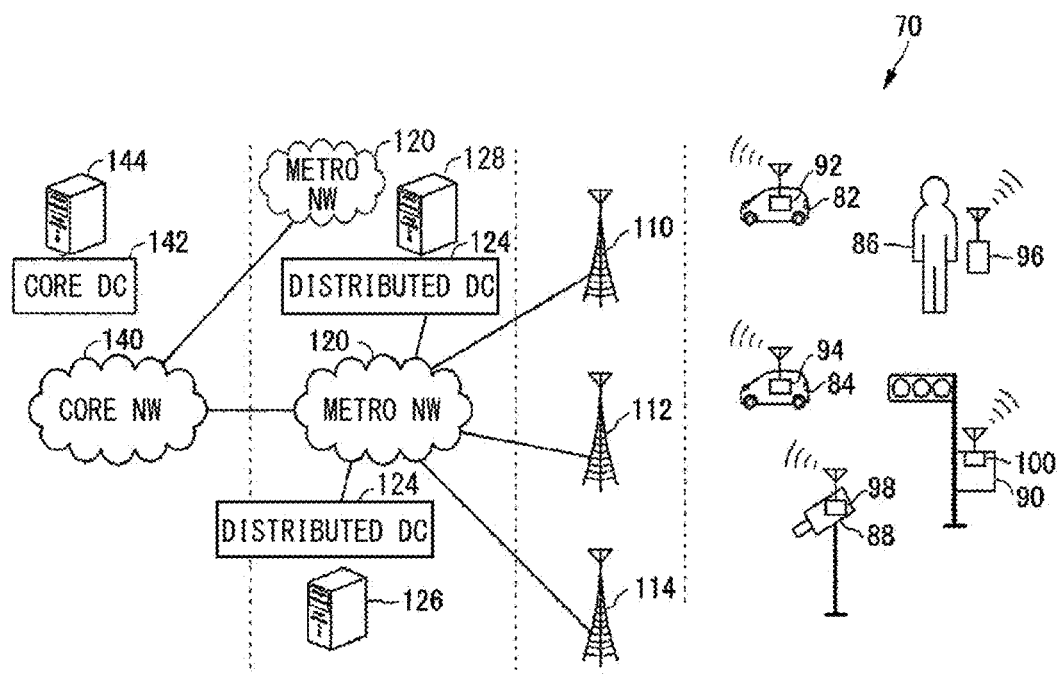
FIG. 2 is a diagram illustrating a schematic configuration of a communication system disclosed in Patent Literature 1.

Problems to be Solved by the Present Disclosure

A traffic situation bird's-eye view map 52 can be constructed and maintained by a communication system as disclosed in Patent Literature 1. Dynamic information and attention information on traffic obtained from the traffic situation bird's-eye view map 52 are transmitted to each communication terminal. As a result, for example, a vehicle equipped with such a communication terminal can know a situation of a road when necessary, which is useful for traffic safety.

However, the above-described related art still has problems to be solved. A first problem is to cope with a dynamic variation in transmission capacity from a vehicle to a traffic assistance server such as an edge server. A large variation may occur in the transmission capacity due to switching of a 4G/5G area and shadowing. In addition, a large variation may occur in the transmission capacity due to an internal state of a vehicle (in-vehicle network, load state of central processing unit (CPU) resource) and a state variation of a traffic assistance server. The traffic assistance system also needs to appropriately deal with the dynamic variation of such transmission capacity. A second problem is selection of sensor data. In a case where all the sensor data cannot be transmitted from the vehicle to the traffic assistance server due to the variation in the transmission capacity, it is necessary to select and transmit a part of the sensor data. For this purpose, it is necessary to determine what sensor data is most efficient to transmit from the vehicle to the traffic assistance server.

There is no related art that solves both the first problem and the second problem. For example, Patent Literature 2 described above proposes a technique of switching a type, resolution, and a frame rate of an image of a camera mounted on a vehicle in response to a change in transmission capacity. However, the technique described in Patent Literature 2 does not consider a state inside an in-vehicle device when such control is performed. In addition, in the technology described in Patent Literature 2, no consideration is provided to conditions under which a sensor should be selected according to various situations in which a vehicle is located, that is, a value of sensor data.

Meanwhile, Patent Literature 3 described above discloses a technique of determining a priority when a data sample is transmitted from a vehicle to a server based on a value of the data sample. In Patent Literature 3, the value of the data sample is calculated based on a data value map in a table called a data value table. Based on the calculated value, the priority of transmission of the data sample to the server is determined. The data value map is determined depending on how the server uses the data sample, and is transmitted to a vehicle at any time. When a vehicle receives the data value map, the vehicle updates the existing data value map with the received data. Therefore, from the viewpoint of the server, data can be collected from a vehicle with a priority according to a use of data.

However. Patent Literature 3 does not disclose a technique of changing a method of calculating value of data in real time based on a situation where a vehicle is located. In particular, in the traffic assistance system, the priority of data to be transmitted to the server should always be processed in real time according to the vehicle and the surrounding situation of the vehicle, rather than the fact that the value of the data changes according to the use. Patent Literature 3 does not disclose such a technique.

Therefore, an object of the present disclosure is to provide an in-vehicle/out-vehicle cooperation device and method capable of determining a priority of data transmission according to a change in transmission capacity and a situation of a vehicle and surroundings thereof so that traffic assistance by a predetermined device such as a traffic assistance server can be effectively performed.

Description of Embodiments of the Present Disclosure

In the following description and drawings, the same components are denoted by the same reference numerals. Therefore, the detailed description thereof will not be repeated. Note that at least some of the following embodiments may be arbitrarily combined.

(1) According to a first aspect of the present disclosure, an in-vehicle/out-vehicle cooperation device used in a vehicle including an in-vehicle network for data transmission, a wireless communication device that wirelessly communicates data with an out-vehicle, and a plurality of sensors includes a data receiving unit configured to receive sensor data from the plurality of sensors via the in-vehicle network, an inter-end delay time estimation unit configured to estimate a transmission delay time of the sensor data between ends from each of the plurality of sensors to a predetermined device communicable by the wireless communication device, a value determination unit configured to determine a value of sensor data output from the plurality of sensors based on a state of the vehicle and states of the plurality of sensors, and a selection unit configured to select a part of the sensor data based on the transmission delay time estimated by the delay time estimation unit and the value determined by the value determination unit, and transmit a copy of the selected sensor data to the predetermined device via the wireless communication device.

The inter-end delay time estimation unit estimates a transmission delay time of sensor data between ends from each of a plurality of sensors mounted on a vehicle to a predetermined device. The value determination unit determines the value of the sensor data output from the plurality of sensors based on the state of the vehicle and the states of the plurality of sensors. The selection unit selects a part of the sensor data based on the transmission delay time estimated by the delay time estimation unit and the value determined by the value determination unit, and transmits a copy of the selected sensor data to a predetermined device via the wireless communication device. The inter-end transmission delay time from the sensor to the specific device is estimated including the delay time in the in-vehicle network, and the sensor data to be transmitted to the predetermined device is selected based on the estimated transmission delay time and the value determined for each of the sensor data. Since the in-vehicle/out-vehicle cooperation device selects sensor data that can be effectively used by a predetermined device in consideration of the inter-end transmission delay time from the sensor to the predetermined device while following a variation in transmission capacity by a wireless communication device, and transmits the sensor data, it is possible to provide an in-vehicle/out-vehicle cooperation device that can demonstrate functions of the predetermined device as much as possible while maximizing the transmission capacity.

(2) The inter-end delay time estimation unit may include a network transmission time estimation unit configured to estimate, for each sensor, a network delay time until the sensor data from the plurality of sensors reaches the data receiving unit via the in-vehicle network, a processing time estimation unit configured to estimate a processing time required for processing until the sensor data that has reached the data receiving unit is input to the wireless communication device, a wireless communication delay time estimation unit configured to estimate a wireless communication delay time required for the sensor data to be transmitted from the wireless communication device to the predetermined device, and a delay time calculation unit configured to calculate the transmission delay time based on a data amount of each of the plurality of sensors, the network delay time, the processing time, and the wireless communication delay time.

In addition to the processing time required for the processing until the sensor data that has reached the data receiving unit is input to the wireless communication device and the wireless communication delay time required for the sensor data to be transmitted from the wireless communication device to a predetermined device, the network delay time until the sensor data from the plurality of sensors reaches the data receiving unit via the in-vehicle network is further estimated for each sensor, and the inter-end transmission delay time is calculated based on the estimated network delay time. Since the inter-end transmission delay time is calculated in consideration of the transmission delay time of the in-vehicle network, the amount of data that can be transmitted to the predetermined device within the allowable delay time can be estimated more accurately, and the sensor data to be transmitted can be selected more accurately.

(3) The value determining unit may include an infrastructure detection range estimation unit configured to estimate a detection range of an infrastructure sensor present in the vicinity of the vehicle based on a position of the vehicle, and a value setting unit configured to estimate a detection range of the plurality of sensors based on a position and an attitude of the vehicle, and set a value of sensor data from each sensor such that the smaller the area of the sensor overlapping with the detection range of the infrastructure sensor estimated by the infrastructure detection range estimation unit, the larger the value.

Among the plurality of sensors mounted on the vehicle, sensor data from a sensor having a large detection range overlapping with the detection range of the infrastructure sensor has a low use value in a predetermined device. The smaller the detection range overlapping with the detection range of the infrastructure sensor, the higher the use value of the sensor data output by the sensor in the predetermined device. Therefore, by estimating the detection range of the infrastructure sensor present in the vicinity of the vehicle and reducing the overlapping range of the detection range and the detection range of the infrastructure sensor but increasing the value, the sensor data from these sensors is preferentially selected and transmitted to the predetermined device. Since sensor data having a high value within a limited transmission capacity is transmitted to a predetermined device, stable processing based on the sensor data can be performed in the predetermined device regardless of the variation in the transmission capacity.

(4) The infrastructure detection range estimation unit may include an infrastructure detection range update unit that repeatedly updates an estimated detection range of an infrastructure sensor present in the vicinity of the vehicle based on the position of the vehicle at predetermined time intervals, and the value setting unit may include a value update unit that repeatedly updates the value of the sensor data from each sensor based on the position and attitude of the vehicle at a predetermined time interval such that the smaller the area of the sensor overlapping with the detection range of the infrastructure sensor updated by the infrastructure detection range update unit, the larger the value.

The detection range of the infrastructure sensor is updated at predetermined time intervals. The value of the sensor data is also updated at predetermined time intervals based on the position and attitude of the vehicle and the updated detection range of the infrastructure sensor. Therefore, the values of each sensor of the vehicle are updated at least at predetermined time intervals following the movement of the vehicle, the communication environment around the vehicle, and the like. As a result, the sensor data having the high value is transmitted to the predetermined device regardless of the movement of the vehicle, the change in the communication environment around the vehicle, and the like. Therefore, the predetermined device can stably perform the processing regardless of the change in the environment.

(5) Each of the plurality of sensors may be classified into any of a plurality of sensor types, the infrastructure detection range estimation unit may include a sensor type detection range estimation unit configured to estimate the detection range of the infrastructure sensor present in the vicinity of the vehicle for each sensor type of the infrastructure sensor based on the position of the vehicle, and the value setting unit may include a sensor type sensor data value setting unit configured to estimate, for each of the plurality of sensor types, a detection range of each of sensors belonging to the sensor type among the plurality of sensors based on a position and an attitude of the vehicle, and set a value of sensor data from a sensor belonging to the sensor type among the plurality of sensors such that the smaller the area of the sensor overlapping with the detection range of the infrastructure sensor estimated for the sensor type by the sensor type detection range estimation unit, the larger the value.

Since the value setting unit sets, for each type of sensor, the value of the sensor data, it is possible to select the sensor data effective for the processing of the predetermined device by more effectively using the transmission capacity.

(6) The in-vehicle/out-vehicle cooperation device may further include: a sensor data set storage unit configured to store information designating a plurality of sensor data sets along with an identifier of each sensor data set, in which the plurality of sensor data sets may include information designating, for each of the plurality of sensor types, a number of sensors selected from the plurality of sensors and a data format related to a data amount of sensor data from the sensors, and the in-vehicle/out-vehicle cooperation device may further include a sensor data set reading unit configured to read, in response to receiving any one of the identifiers from the predetermined device, information of the sensor data set corresponding to the identifier from the sensor data set storage unit, a sensor data selection unit configured to select, for each of the plurality of sensor types, sensor data from sensors, the number of which is designated by the information of the sensor data set read by the sensor data set reading unit, in descending order of the value based on the information of the sensor data set read by the sensor data set reading unit and the value set for the sensor data from each sensor by the sensor type sensor data value setting unit, and a network setting unit configured to set the in-vehicle network to transmit the sensor data selected by the sensor data selection unit in preference to other sensor data.

When an identifier designating any one of the sensor data sets is assigned to the in-vehicle/out-vehicle cooperation device, sensors, the number of which is designated by the sensor data set, are selected, for each sensor type, in descending order of the value of the sensor data. For all types of sensors, pieces of sensor data with a value, the number of which is predetermined, are transmitted to the predetermined device based on the designation by the sensor data set. As a result, the predetermined device can execute stable processing by effectively using the sensor data.

(7) The vehicle may further include a vehicle control device configured to control the vehicle using the sensor data from the plurality of sensors, and the vehicle control device may include an autonomous driving electronic control unit (ECU) configured to perform autonomous driving of the vehicle using the sensor data received from the plurality of sensors via the network.

The autonomous driving ECU operates based on sensor data from a plurality of sensors mounted on the vehicle. Since any one of these sensor data is selected by the in-vehicle/out-vehicle cooperation device and transmitted to the predetermined device, the sensor data can be shared between the autonomous driving ECU and the predetermined device, and the autonomous driving of the vehicle and the execution of the process of the predetermined device can be efficiently performed.

(8) The vehicle control device may include a remote control ECU configured to control the vehicle according to a predetermined remote control command, a sensor data transmitting unit configured to transmit the sensor data received from the plurality of sensors via the network to an external remote control device via the wireless communication device, and an input device configured to input a remote control command received from the remote control device via the wireless communication device to the remote control ECU.

The remote control device operates based on sensor data received from a plurality of sensors mounted on the vehicle, and transmits a remote control command to the remote control ECU. Any of the sensor data transmitted to the remote control device is selected by the in-vehicle/out-vehicle cooperation device and transmitted to the predetermined device. Therefore, the sensor data can be shared between the remote control device and the predetermined device, and the remote control of the vehicle and the execution of the process of the predetermined device can be efficiently performed.

(9) According to a second aspect of the present disclosure, an in-vehicle/out-vehicle cooperation method of cooperating an in-vehicle and an out-vehicle by transmitting sensor data from a plurality of sensors to a predetermined external device in a vehicle including the in-vehicle network for data transmission, a wireless communication device that wirelessly communicates data with the out-vehicle, and the plurality of sensors includes receiving sensor data from a plurality of sensors mounted on a vehicle via an in-vehicle network by a computer, estimating a transmission delay time of the sensor data between ends from the sensor to a predetermined device communicable by the wireless communication device by the computer, determining a value of sensor data output from the plurality of sensors based on a state of the vehicle and states of the plurality of sensors by the computer, and selecting a part of the sensor data based on the transmission delay time estimated in the estimating of the transmission delay time and the value determined by the determining of the value, and transmitting a copy of the selected sensor data to the predetermined device via the wireless communication device by the computer.

In step of estimating the transmission delay time of the sensor data between the ends, the transmission delay time of the sensor data between the ends from each of the plurality of sensors mounted on the vehicle to the predetermined device is estimated. The value of the sensor data output from the plurality of sensors is determined based on the state of the vehicle and the states of the plurality of sensors. A part of the sensor data is selected based on the estimated transmission delay time and the value determined in step of determining the value, and a copy of the sensor data is transmitted to the predetermined device via the wireless communication device. The inter-end transmission delay time from the sensor to the specific device is estimated including the delay time in the in-vehicle network, and the sensor data to be transmitted to the predetermined device is selected based on the estimated transmission delay time and the value determined for each of the sensor data. Since the sensor data that can be effectively used by the predetermined device in consideration of the inter-end transmission delay time from the sensor to the predetermined device while following the variation in transmission capacity by the wireless communication is selected and transmitted, it is possible to provide an in-vehicle/out-vehicle cooperation method that can demonstrate the functions of the predetermined device as much as possible while maximizing the transmission capacity.

Effects of the Present Disclosure

As described above, according to the present disclosure, it is possible to provide an in-vehicle/out-vehicle cooperation device and method capable of determining a priority of data transmission according to a change in transmission capacity and a situation of a vehicle and surroundings thereof so that traffic assistance by a predetermined device such as a traffic assistance server can be effectively performed.

First Embodiment

<Configuration>
<<Overall Configuration>>

Figure 3:
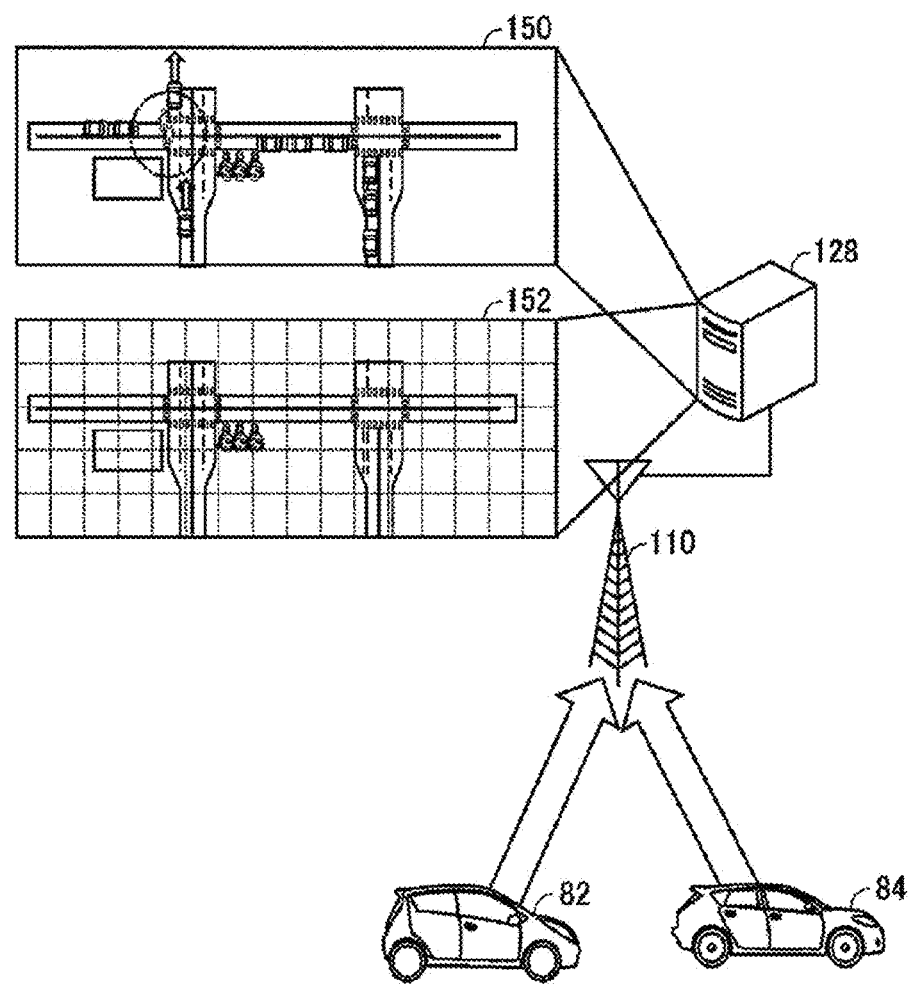
FIG. 3 is a diagram illustrating a schematic configuration of a traffic assistance system according to a first embodiment of the present disclosure.

FIG. 3 is a schematic configuration diagram of a traffic assistance system according to the present disclosure. Referring to FIG. 3, similarly to that described in Patent Literature 1, the traffic assistance system includes vehicles 82 and 84, an infrastructure sensor (not illustrated), a mobile phone carried by a pedestrian, and the like, and an edge server 128 that is a traffic assistance server communicating therewith via a base station 110 and performing a process of constructing and maintaining a communication situation map 152 and a traffic situation bird's-eye view map 150.

The communication situation map 152 is obtained by, for example, dividing a high definition map prepared in advance for traffic assistance into a grid pattern including a plurality of divisions having sides of a certain length and recording a communication situation in each division. Typically, the communication situation related to each division is represented by a center position of the division and a representative value of a transmission rate of data transmitted from vehicles in the division to the traffic assistance server during a certain past period. In order to calculate the representative value of the transmission rate in the certain past period, data related to the transmission rate of the data received by the traffic assistance server during the certain past period is also accumulated. As the representative value of the transmission rate, typically, an average transmission rate, a mode of the transmission rate, a median of the transmission rate, these representative values calculated from pieces of data excluding pieces of data having upper and lower values, the numbers of which are predetermined, and the like can be used.

The traffic situation bird's-eye view map is a map in which, for a certain area, positions, speeds, attributes, and the like of moving objects such as vehicles and pedestrians and fixed objects such as buildings present in the area are stored in association with identification numbers on a high definition map prepared in advance in a virtual space. The traffic situation bird's-eye view map is constructed based on data transmitted from a so-called infrastructure sensor provided in an area and an in-vehicle sensor mounted on a vehicle, and information obtained from a predetermined source regarding road construction, an accident, an installation place of the infrastructure sensor, an attribute thereof, and the like.

Hereinafter, the first embodiment will be described as an example of how to transmit sensor data from the vehicle 82 to the edge server 128.

<<In-Vehicle Device>>

Figure 4:
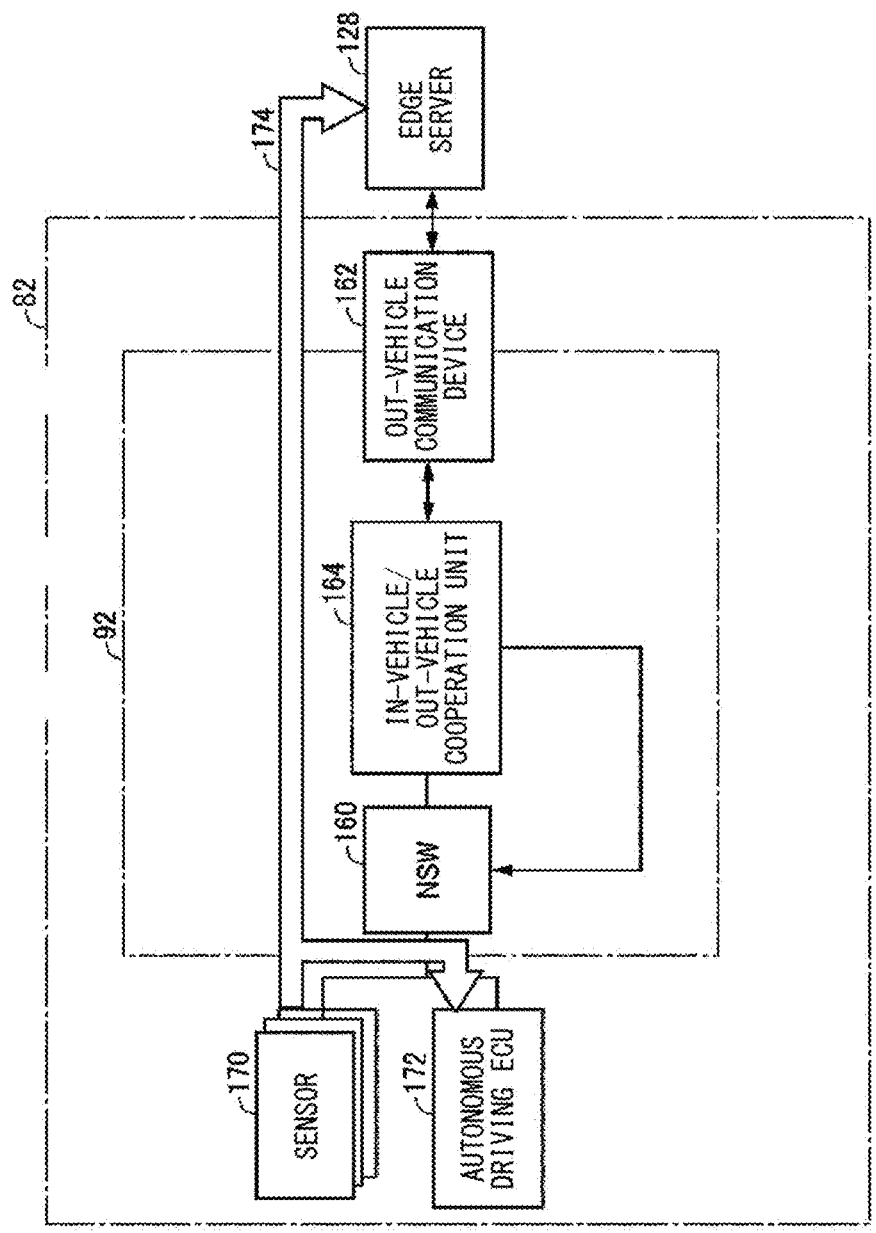
FIG. 4 is a block diagram illustrating a configuration of elements related to the traffic assistance system in a vehicle according to the first embodiment of the present disclosure.

Referring to FIG. 4, the vehicle 82 includes various sensors 170, an autonomous driving electronic control unit (ECU) 172 that controls autonomous driving of the vehicle, an in-vehicle device 92 that collects sensor data from these sensors 170 and controls the autonomous driving ECU 172 while communicating with the autonomous driving ECU 172, and an out-vehicle communication device 162 used when the in-vehicle device 92 communicates with an out-vehicle element such as the edge server 128 and another vehicle.

The in-vehicle device 92 includes a network switch (NSW) 160 for in-vehicle communication to which the sensor 170, the autonomous driving ECU 172, and the like are connected, and an in-vehicle/out-vehicle cooperation unit 164 that is connected to the sensor 170 and the autonomous driving ECU 172 via the NSW 160, transmits sensor data from the sensor 170 to the outside via the out-vehicle communication device 162, and an in-vehicle/out-vehicle cooperation unit 164 that cooperatively controls an operating state of the autonomous driving ECU 172 and the like using information collected from the in-vehicle sensor and the like and data received from the outside via the out-vehicle communication device 162. As will be described later, the in-vehicle/out-vehicle cooperation unit 164 controls processing when sensor data is collected and processing when sensor data is transmitted to the outside in response to an instruction from the edge server 128 and a change in situation of the vehicle 82. Note that the in-vehicle device 92 illustrated in FIG. 4 includes the NSW 160 and the in-vehicle/out-vehicle cooperation unit 164, but may be one in-vehicle device including the autonomous driving ECU 172, the out-vehicle communication device 162, or both. The in-vehicle device 92 may be implemented as a semiconductor integrated circuit such as an application specific integrated circuit (ASIC) or a system large scale integration (LSI), or a device in which a plurality of semiconductor integrated circuits is mounted on a substrate.

Normally, the sensor data from the sensor 170 is transmitted to the autonomous driving ECU 172, but as indicated by an arrow 174, a part of the sensor data is selected by the in-vehicle/out-vehicle cooperation unit 164 and transmitted to the edge server 128. In the following embodiment, how the in-vehicle/out-vehicle cooperation unit 164 selects sensor data that enables the edge server 128 to construct the traffic situation bird's-eye view map 150 most efficiently according to the transmission capacity between the out-vehicle communication device 162 and the edge server 128, the processing time in the network in the vehicle 82, the in-vehicle/out-vehicle cooperation unit 164, and the like, and the situation in which the vehicle 82 is located will be described.

Note that the number of sensors mounted on the vehicle is very large, and it is expected that the number will increase more and more in the future, and the amount of data output from each sensor will also increase. Therefore, it is considered that a transmission rate of an in-vehicle network as used in the related art is insufficient, and it is considered to use a network having a transmission rate of a gigabit class for the in-vehicle network. As will be described later with reference to FIG. 6, in the following embodiment, the in-vehicle devices of the vehicle 82 communicate with each other via such a network. The existing technology related to a network that connects computers can be applied to such a network, and thus, it is expected that the cost for constructing an in-vehicle network will be reduced. In this example, transmission control protocol-Internet protocol (TCP-IP), which is currently most widely used, is adopted as a communication protocol of the in-vehicle network.

<<Traffic Assistance Server>>

Figure 5:
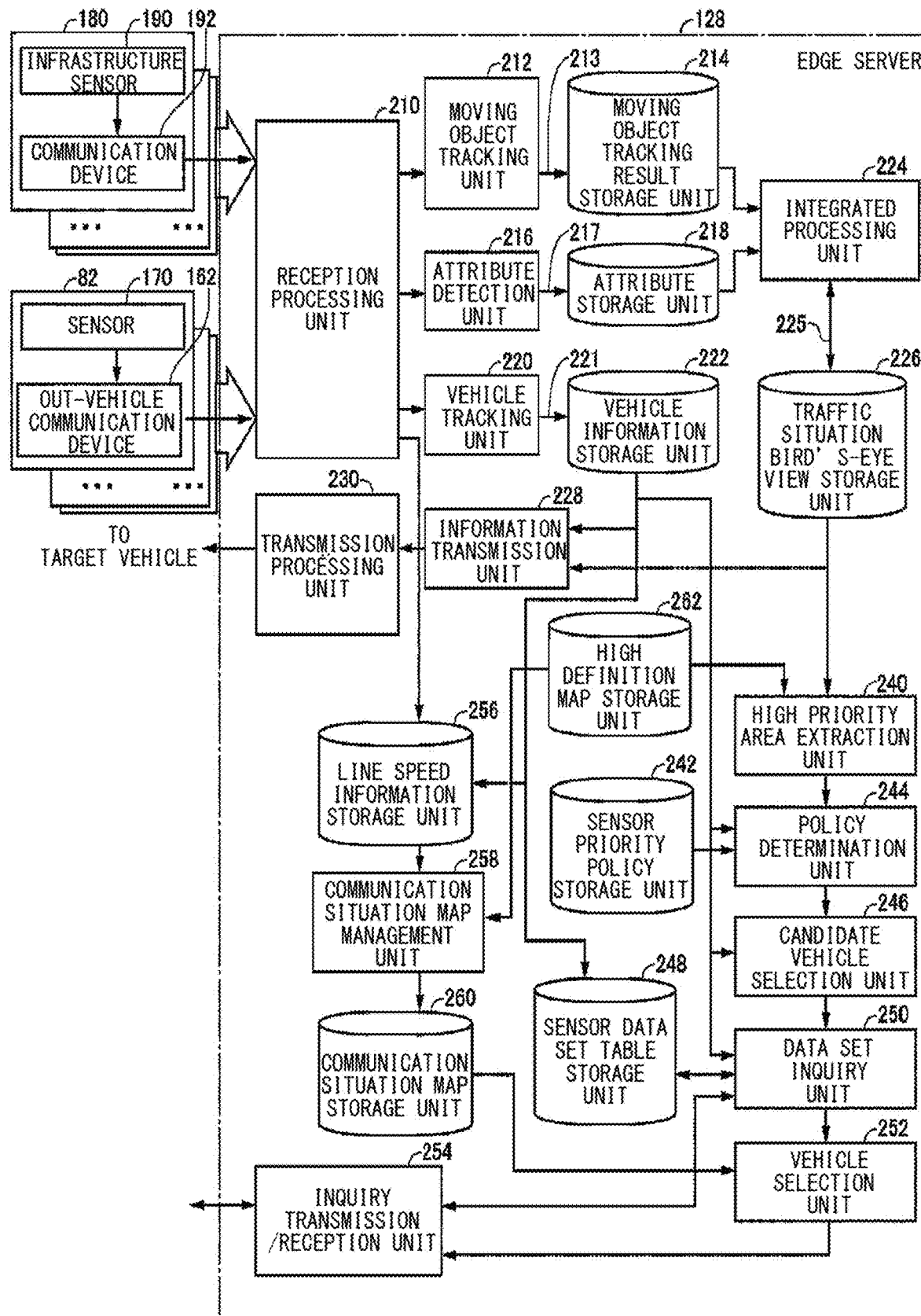
FIG. 5 is a block diagram illustrating a configuration of an edge server that is a traffic assistance server that communicates with a vehicle according to the first embodiment of the present disclosure.

Referring to FIG. 5, as described above, the edge server 128 includes a reception processing unit 210 that receives signals from a plurality of infrastructure sensor facilities 180 (any combination of a camera, a millimeter wave radar, and a LiDAR) and signals from the sensors (any combination of a camera, a LiDAR, and a millimeter wave radar) 170 mounted on the vehicle 82. Each of the infrastructure sensor facilities 180 includes an infrastructure sensor 190 that includes any combination of a camera, a millimeter wave radar, and a LiDAR, and a communication device 192 that transmits a signal output from the infrastructure sensor 190 to the reception processing unit 210 of the edge server 128. Similarly, the vehicle 82 includes a sensor 170 that includes a camera, a LiDAR, or a millimeter wave radar, and an out-vehicle communication device 162 that transmits at least a part of the signal output from the sensor 170 to the reception processing unit 210 of the edge server 128.

The edge server 128 further includes a moving object tracking unit 212 that analyzes a distance measurement signal from the LiDAR, the millimeter wave radar, or the like among the signals received by the reception processing unit 210 to determine and track positions of each moving object in a predetermined first cycle and output a moving object tracking result 213, a moving object tracking result storage unit 214 that stores the moving object tracking result 213, and an attribute detection unit 216 that performs image analysis on image data from a camera among the signals received by the reception processing unit 210 to determine the attribute and position of the moving object such as the vehicle and the person in the image in a predetermined second cycle longer than the first cycle. The edge server 128 further includes an attribute storage unit 218 that stores an attribute 217 output by the attribute detection unit 216, an integrated processing unit 224 that repeatedly integrates the moving object tracking result 213 stored in the moving object tracking result storage unit 214 and the attribute 217 stored in the attribute storage unit 218 in a cycle shorter than the second cycle and outputs the traffic situation bird's-eye view map 225 which is the integrated analysis result, and a traffic situation bird's-eye view map storage unit 226 that accumulates and stores a traffic situation bird's-eye view map 225 output by the integrated processing unit 224.

The moving object tracking result 213, the attribute 217, and the traffic situation bird's-eye view map 225 are calculated at predetermined time intervals, but the analysis results calculated at a predetermined time in the past are also accumulated and stored as histories in the moving object tracking result storage unit 214, the attribute storage unit 218, and the traffic situation bird's-eye view map storage unit 226, respectively. When the integrated processing unit 224 performs the integrated processing, the history of the traffic situation bird's-eye view map 225 which is a past integrated analysis result accumulated in the traffic situation bird's-eye view map storage unit 226 may be referred to.

The edge server 128 further includes a vehicle tracking unit 220 that obtains vehicle information including vehicle attributes such as identification information of a vehicle to be managed, mounted sensor information, a position, a speed, and a vehicle size based on the signal received by the reception processing unit 210 from each vehicle, and a vehicle information storage unit 222 that stores the vehicle information 221 of each vehicle analyzed by the vehicle tracking unit 220.

The edge server 128 further includes an information transmission unit 228 that collates the moving object information of the traffic situation bird's-eye view map 225 and the vehicle information 221 stored in the vehicle information storage unit 222, and performs a process of notifying a vehicle located within a predetermined range from an object of information for traffic assistance such as information on a moving object having an attribute considered to be dangerous, such as a child or a pedestrian walking while looking at a smartphone, an accident vehicle on a road, a failed vehicle, a falling object, or the like in the integrated moving object information, and a transmission processing unit 230 that transmits a signal for information notification by the information transmission unit 228 to a target vehicle.

The edge server 128 further includes a high definition map storage unit 262 that stores a high definition map, and a high priority area extraction unit 240 that extracts coordinates for specifying a high priority area based on the traffic situation bird's-eye view map stored in the traffic situation bird's-eye view map storage unit 226 and the high definition map stored in the high definition map storage unit 262. Here, the high priority area is an area where it is necessary to preferentially collect sensor data related to the area. As the high priority area, for example, an area where moving bodies corresponding to a number equal to or larger than a predetermined threshold value exists in the area, an area where a moving body having an attribute that may take a dangerous behavior such as a child is detected, and the like are considered. For example, the high priority area extraction unit 240 divides a road map into predetermined divisions, and determines whether each division satisfies the above-described condition to extract a high priority area. For detection of an area where moving bodies equal to or more than a threshold value are gathered, a plurality of areas (for example, intersection and the like) of interest may be determined in advance on the road map, and it may be inspected whether only the area satisfies the condition.

The edge server 128 further includes a sensor priority policy storage unit 242 that stores a plurality of sensor priority policies to be described later, a policy determination unit 244 that determines which of the sensor priority policies stored in the sensor priority policy storage unit 242 is applied to each of the high priority areas extracted by the high priority area extraction unit 240 according to the situation of the extracted area, and a candidate vehicle selection unit 246 that selects, for each of the areas extracted by the high priority area extraction unit 240, a vehicle including the area as a detection range of the sensor as a candidate for a target vehicle of sensor data collection. That is, in the high priority area, the edge server 128 collects sensor data from only some vehicles. Some of these vehicles are vehicles including sensors and transmission devices with high performance. By selecting such vehicles and collecting sensor data, the edge server 128 can collect necessary sensor data with a margin even when there are a large number of vehicles in the high priority area and the communication situations may deteriorate.

The sensor priority policy indicates a guideline on what kind of sensor to prioritize sensor data in the sensor data. For example, it is assumed that it is detected that a child is present in a certain area. Here, such an area is referred to as a child detection area. Unlike adults, children may suddenly move unexpectedly. Therefore, in the child detection area, it is necessary to acquire information on the detected position of the moving object at a high frequency. Therefore, it is necessary to transmit sensor data from a sensor such as a LIDAR that can detect a position of a moving object at high speed to the edge server 128 in preference to sensor data from a sensor such as a camera that is difficult to detect the position of the moving object or takes time. Meanwhile, for example, an area where there is an accident vehicle on a road is considered. Here, such an area is referred to as an accident area. Since the accident vehicle does not normally move, it is not particularly necessary to transmit the position coordinates to the edge server 128 at a high frequency. In addition, in order to know the situation of the accident, it is easier for a driver of each vehicle to understand the situation by distributing to each vehicle in the form of an image like a camera. Therefore, in such an area, it is better to prioritize the camera over the LiDAR. As described above, the sensor priority policy is to provide a basic guideline on which sensor data to preferentially transmit to the edge server 128 according to the situation of each area.

In the present embodiment, it is assumed that each vehicle transmits sensor data to the edge server 128 in areas other than the high priority area. In this case, coordinates (relative coordinates with respect to a basic position of a vehicle) for specifying the detection range by the sensor of the vehicle are transmitted as the vehicle information. An absolute coordinate of a range that can be detected by the sensor of each vehicle is calculated from the coordinates and the coordinates of the basic position of the vehicle, and the candidate vehicle can be selected by collating the coordinates and the coordinates of each area.

The edge server 128 further includes a data set inquiry unit 250 that transmits the sensor priority policy determined by the policy determination unit 244 to each of the candidate vehicles selected by the candidate vehicle selection unit 246 and inquires a sensor data set table including a sensor data set when each vehicle transmits the sensor priority policy to the edge server 128 according to the sensor priority policy, a sensor data set table storage unit 248 that stores, for each vehicle, the sensor data set table obtained from each candidate vehicle for the inquiry by the data set inquiry unit 250, a vehicle selection unit 252 that selects a vehicle that can transmit the most efficient sensor data for the edge server 128 to create the traffic situation bird's-eye view map based on the sensor data set tables and transmits an instruction to request the selected vehicle to transmit the sensor data, and an inquiry transmission/reception unit 254 that performs communication with each vehicle by the data set inquiry unit 250 and the vehicle selection unit 252 by wireless communication.

Various criteria can be considered from a viewpoint of a designer for transmitting the most effective sensor data for creating the traffic situation bird's-eye view map. For example, it can be considered that the most important data from the viewpoint of driving assistance of a traffic participant, that is, data that is worth leading to accident prevention is transmitted to the edge server 128 at a transmission rate sufficient for the data. From another viewpoint, it can also be considered that the sensor data is transmitted to the edge server 128 so that the contents of the traffic situation bird's-eye view map are as accurate as possible and can follow the actual change at a sufficient speed. In this case, the traffic situation bird's-eye view map is divided into several areas, and it can be considered important to change the importance of each area and to reflect the change in the traffic situation bird's-eye view map at a higher follow-up speed than other areas for important areas. In short, satisfying a criterion that enables effective data to be transmitted to the edge server 128 from the viewpoint that a designer of a system places the most importance on maintaining and managing the traffic situation bird's-eye view map and enables a load on the edge server 128 to be prevented from becoming excessive corresponds to "most effective sensor data is transmitted to the edge server 128 most efficiently".

Referring to FIG. 5, the edge server 128 further includes a line speed information storage unit 256 that extracts line speed information when the reception processing unit 210 transmits data from each division to the edge server 128 based on the sensor data, the vehicle information, and the like received from the vehicle of each division of the high definition map and stores the line speed information for a predetermined time, a communication situation map management unit 258 that creates and manages a communication situation map indicating a communication situation for each division of the high definition map stored in the high definition map storage unit 262 based on the line speed information stored in the line speed information storage unit 256, and a communication situation map storage unit 260 that stores the communication situation map created by the communication situation map management unit 258. When the data set inquiry unit 250 requests the transmission data set table set from each vehicle, the communication situation map is referred to.

Note that, in FIG. 5, the inquiry transmission/reception unit 254 may use the same hardware as the reception processing unit 210 and the transmission processing unit 230. Whether the sensor priority policy is satisfied can be quantitatively determined, but in this embodiment, as will be described later, it is determined in advance using the sensor data set table according to each sensor priority policy. The sensor data set table can be created based on a subjective standard, or can be created by formulating a certain mathematical expression based on various factors such as a transmission capacity such as a line speed, the number of high priority areas of interest in the traffic situation bird's-eye view map, a position of a vehicle in the area, an ability of transmission equipment of each vehicle, and the number of moving bodies present in the area, and comparing values obtained by applying these factors to the mathematical expression. However, in practice, it is realistic to use a method using the sensor data set table described below.

In this embodiment, it is assumed that a sensor data set table is prepared in advance for each vehicle. Each vehicle transmits these sensor data set tables to the data set inquiry unit 250 in response to the inquiry from the data set inquiry unit 250. The sensor data set table will be described later with reference to FIG. 9.

Note that the sensor data set table to be used may be switched depending on what sensor priority policy is adopted. In addition, as the sensor, each vehicle or infrastructure sensor may have at least a sensor such as a LiDAR or a millimeter wave radar that detects a position of an object, and a sensor such as a camera that acquires an image. Note that, in this embodiment, an intersection or the like with many moving bodies and an area or the like with a child are both extracted as a high priority area at the same level. However, the present disclosure is not limited to such embodiments. The intersection and the like are rather wide, the area or the like where the child is detected is narrow, and the characters of both are different. Therefore, only one of them may be extracted. Alternatively, a wide area may be extracted first, and a narrow area may be extracted therefrom.

Note that both of the image sensor such as a camera and the distance measurement sensor such as a LiDAR and a millimeter wave radar have different definition (resolution) and different sensor data amounts depending on specifications of products. Therefore, it is necessary to prepare a sensor data set table conforming to each sensor priority policy in sufficient consideration of the type of the target sensor, the definition of the sensor data, and the transmission interval.

Figure 6:
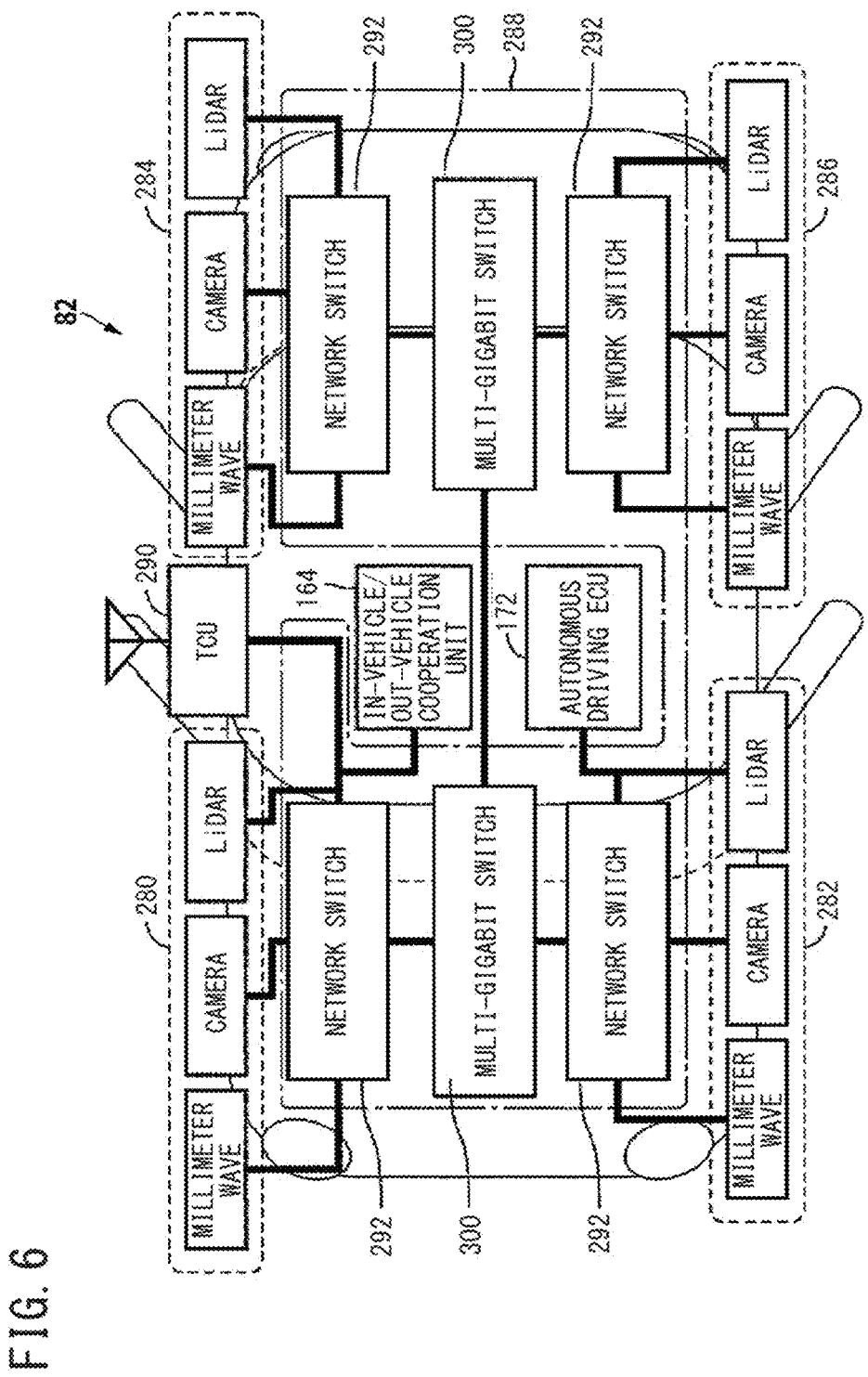
FIG. 6 is a block diagram schematically illustrating a configuration for communication of a sensor and sensor data of the vehicle according to the first embodiment.

FIG. 6 exemplarily illustrates a sensor arrangement and a network configuration of the vehicle 82. Referring to FIG. 6, the vehicle 82 includes an in-vehicle network 288 having a transmission rate of a gigabit class to which the in-vehicle/out-vehicle cooperation unit 164 and the autonomous driving ECU 172 are connected, and sensor units 280, 282, 284, and 286 mounted on a right front portion, a left front portion, a right rear portion, and a left rear portion of the vehicle 82, respectively.

Each of the sensor units 280, 282, 284, and 286 includes a millimeter wave radar, a camera, and a LiDAR.

In this embodiment, the in-vehicle network 288 includes four gigabit class network switches 292, 294, 296, and 298 to which sensors belonging to the same sensor unit are respectively connected, a first multi-gigabit switch 300 that bridges between two network switches 292 and 294 in the front of the vehicle, and a second multi-gigabit switch 302 that bridges between two network switches 296 and 298 in the rear of the vehicle, and is also connected to the first multi-gigabit switch 300. The in-vehicle/out-vehicle cooperation unit 164 is connected to the network switch 292, and the autonomous driving ECU 172 is connected to the network switch 294. A telematics control unit (TCU) 290 corresponding to the out-vehicle communication device 162 illustrated in FIG. 4 is connected to the network switch 292 along with the in-vehicle/out-vehicle cooperation unit 164.

In this manner, the sensor units 280, 282, 284, and 286 are arranged at different positions of the vehicle. Therefore, depending on the situation in which the vehicle is located, the value of the sensor data from these sensor units may be different as described later.

Figure 7:
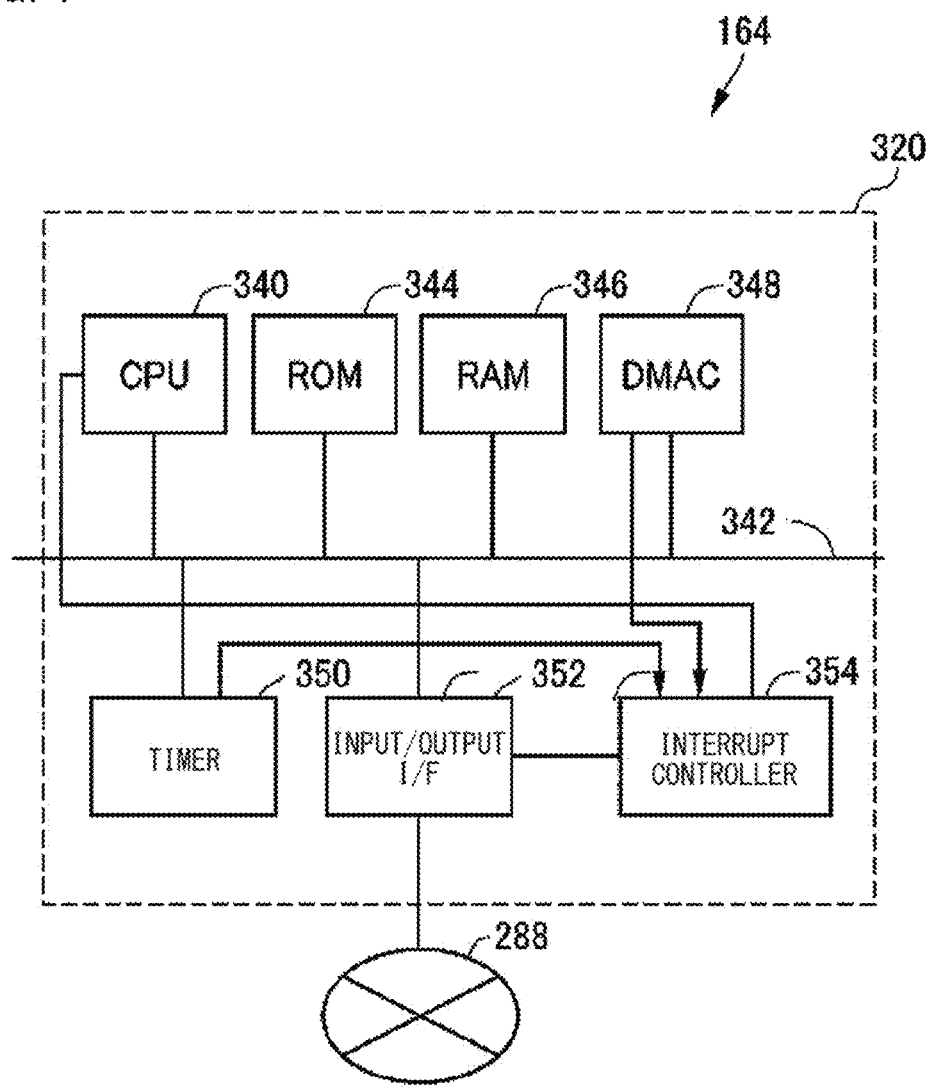
FIG. 7 is a block diagram illustrating a schematic hardware configuration of an in-vehicle/out-vehicle cooperation unit used in the vehicle according to the first embodiment illustrated in FIG. 6.

FIG. 7 illustrates a hardware configuration of the in-vehicle/out-vehicle cooperation unit 164. Referring to FIG. 7, the in-vehicle/out-vehicle cooperation unit 164 includes a microprocessor 320. The microprocessor 320 includes a bus 342 and an interrupt controller 354 that is connected to a CPU 340, a read-only memory (ROM) 344, a random access memory (RAM) 346, a direct media access controller (DMAC) 348, an input/output interface (I/F) 352, a timer 350, a DMAC 348, a timer 350, and an input/output I/F 352, all of which are connected to the bus 342, and causes a CPU 340 to interrupt in response to signals from these components.

The interrupt controller 354 causes the CPU 340 to periodically interrupt the timer based on the clocking by the timer 350. The interrupt controller 354 also causes an input/output interrupt to the CPU 340 when there is an input/output from the outside of the input/output I/F 352. Further, when the data transmission by the DMAC 348 is terminated, the interrupt controller 354 causes the CPU 340 to interrupt in response to a signal from the DMAC 348.

Figure 8:
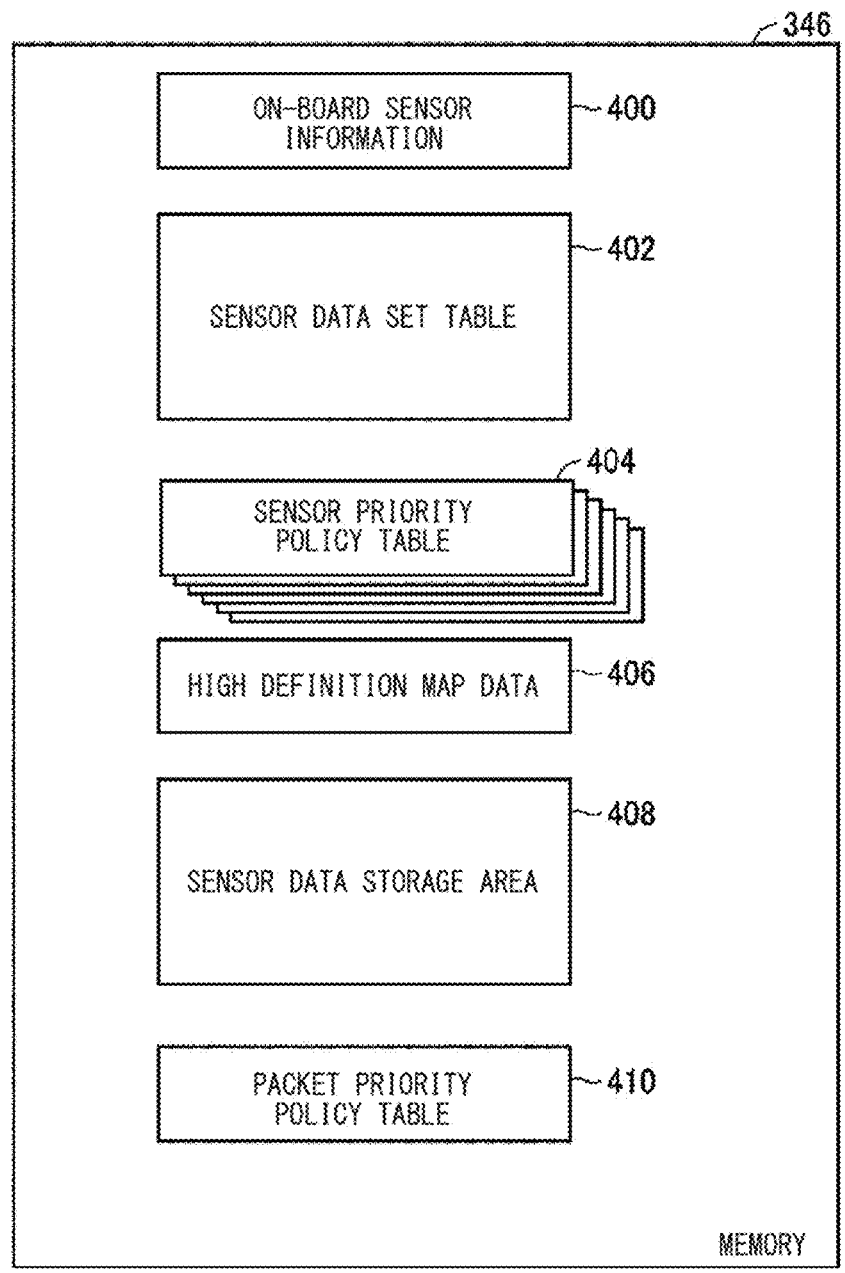
FIG. 8 is a diagram illustrating data stored in a memory of the in-vehicle/out-vehicle cooperation unit illustrated in FIG. 7 and required for in-vehicle/out-vehicle cooperation.

FIG. 8 illustrates the RAM 346 stored by the in-vehicle/out-vehicle cooperation unit 164 illustrated in FIG. 4 for vehicle inside/outside cooperation. Among these pieces of data, all fixed data is stored in the ROM 344 illustrated in FIG. 7 and loaded into the RAM 346 when the CPU 340 executes the program. Other data is dynamically generated by the CPU 340 and stored in the RAM 346 when the program is executed.

Referring to FIG. 8, the RAM 346 includes on-board sensor information 400 that is information on a sensor mounted on the vehicle 82, a sensor data set table 402 that stores a plurality of sensor data sets to be transmitted to the outside by the vehicle 82, a sensor priority policy table 404 that stores a plurality of sensor priority policies indicating how to determine priority for each of various types of sensors according to a situation of the vehicle 82 or the like when a sensor data set at the time of transmission to the outside is designated, a high definition map data 406 for a navigation system (not illustrated) mounted on the vehicle 82, a sensor data storage area 408 that temporarily stores sensor data transmitted from various sensors mounted on the vehicle 82 to the in-vehicle/out-vehicle cooperation unit 164 for transmission to the edge server 128, and when the sensor data set to send is determined and the sensor priority is determined, a packet priority policy table 410 that holds information (packet priority policy) for setting the priority of packet transmission in a table format so that the network switches 292, 294, 296, 298, the first multi-gigabit switch 300 and the second multi-gigabit switch 302 illustrated in FIG. 6 transmits a packet of the sensor data according to the priority. The packet priority policy is information for designating a packet priority that can be set in each switch, the number of queues for each packet priority, a packet transmission frequency for each priority, and the like. By doing this, a packet transmission policy for each priority is set for each packet, and information designating the priority is stored in the packet header of the sensor data, so each switch executes transmission processing according to the priority.

FIG. 9 illustrates an example of the sensor data set table 402 stored in the RAM 346. Referring to FIG. 9, the sensor data set table 402 stores eight sensor data sets indicated by identification numbers (IDs) 0 to 7 in a first column in this example. The identification numbers are defined in this embodiment such that the smaller the amount of data transmitted when each sensor data set is selected, the larger the amount of data transmitted.

In the example illustrated in FIG. 9, the LiDAR, the millimeter wave radar, and the camera are assumed as a sensor. A second column of FIG. 9 represents the nature of the data transmitted in each sensor data set. In the example illustrated in FIG. 9, the resolution or the compression rate at the time of transmission of the sensor data of the LiDAR, the millimeter wave radar, and the camera is illustrated in order from the left. For example, in the sensor data set of identification number 2, the LiDAR is uncompressed, the millimeter wave radar is also uncompressed, and the image data of the camera is a standard definition (SD) image. The SD image is an image including 720×480 pixels or 720×576 pixels. In the case of ID=5, the LiDAR is uncompressed, and the millimeter wave radar is also uncompressed, but the camera image is a full high definition (HD) image. The full HD image is an image including 1900×1080 pixels. The "HD image" of identification numbers 3, 6, and the like is an image including 1280×780 pixels. These images are images obtained from the same camera, and a central portion thereof is common to images of any resolution. That is, the HD image is an image of a central portion of the full HD image, and the SD image is an image of a central portion of the HD image. By selecting data in this manner, an image in a direction in which the camera is always facing is transmitted to the edge server 128.

The third column is an interval (data interval) at which data is transmitted. In this example, this data interval is also defined for each ID and for each sensor. FIG. 9 illustrates that, for example, for identification number 1, both the LiDAR and the millimeter wave radar transmit ten times per second, and a camera image is not transmitted. For identification number 5, both the LiDAR and the millimeter wave radar transmit ten times per second, and for the camera image, a full HD image is transmitted to the edge server 128 three times.

The rightmost column shows how many sensors of each type of sensors mounted on the vehicle transmit data. For example, for identification number 1, it is indicated that, both the LiDAR and the millimeter wave radar transmit four pieces of data, and for the camera, data is not used. For identification number 4, both the LiDAR and the millimeter wave radar transmit data of four sensors, whereas the number of cameras is four. On the other hand, for identification number 6, the number of LiDAR and the number of millimeter wave radars are the same four, but only two cameras are used.

In this manner, for each identification number, the total amount of data to be transmitted can be controlled by designating the resolution or compression rate of each sensor, the transmission interval, and the number of sensors to be used. That is, by designating a sensor data set ID, it is possible to control the contents and the total amount of sensor data transmitted from the vehicle to the edge server 128.

Note that, in the above description, a child detection area and an accident area are cited as the nature of the area, but the nature of the area is not limited thereto. For example, even for an adult, it is necessary to pay attention to an adult operating a smartphone as a child. The same applies to a case where a bicycle with two or three riders is detected. Furthermore, an example in which priority is provided to the camera image can include a place where there are many parked vehicles, a place where there is a traffic jam for a long time, an area (failed vehicle area) where a failed vehicle stops at a position where the vehicle usually does not stop, and the like.

In this embodiment, as described above, the sensor data set table of each vehicle is transmitted from each vehicle to the edge server 128. After determining the high priority area, the edge server 128 refers to the sensor data set table of each vehicle, determines which vehicle transmits the sensor data set corresponding to which identification number, designates the identification number of the sensor data set to the vehicle, and requests the vehicle to transmit the sensor data. When this request is received, the vehicle determines whether all the sensor data set corresponding to the identification number transmitted from the edge server 128 can be transmitted within the allowable delay time based on the available transmission capacity, the delay time of data communication by the network in the vehicle, the processing time by the CPU mounted in the in-vehicle device, the transmission delay to the edge server 128, and the like. If the determination is affirmative, the transmission of the designated sensor data set is started. If the determination is negative, the edge server 128 is requested to lower the identification number by 1, and the transmission of the sensor data is not started. When there is a response from the vehicle to lower the identification number by 1, the edge server 128 selects another vehicle and requests the vehicle to transmit a specific sensor data set. When the transmission of the sensor data set from any vehicle is started, the communication is continued, and when there is a request to lower the identification number by one from all the vehicles, the amount of sensor data to be transmitted is reduced, a value lower by one than the number previously designated is designated as the identification number of the sensor data set, and the selection of the vehicle and the transmission request of the sensor data are repeated again. Details of this procedure will be described later with reference to FIG. 15.

FIG. 10 illustrates an example of the sensor priority policy table 404 defined for the identification number of the sensor data set. One illustrated in FIG. 10 corresponds to identification number 3 or 6 in FIG. 9. The numbers of sensors of the sensor data set of identification number 3 in FIG. 9 are "4, 4, 2". That is, the number of millimeter wave radars and the number of LiDARs are four, and the number of cameras is two. In the example illustrated in FIG. 10, assuming that there are four millimeter wave radars #0, #1, #2, and #3 as the millimeter wave radars, these radars are adopted in this order. Similarly, in the case of the LiDAR, when LiDAR #0, #1, #2, and #3 are present, they are adopted in this order. For the camera, when it is assumed that there are cameras #0, #1, #2, and #3, the cameras #2 and #3 are adopted among these cameras. As described above, which of the four cameras to use is determined based on the value of the sensor data obtained from each camera.

Hereinafter, as in the above-described camera, when only two cameras are adopted among four cameras, an example of a method for determining how to determine which camera to adopt (how to create the sensor priority policy table 404) will be described.

Figure 13:
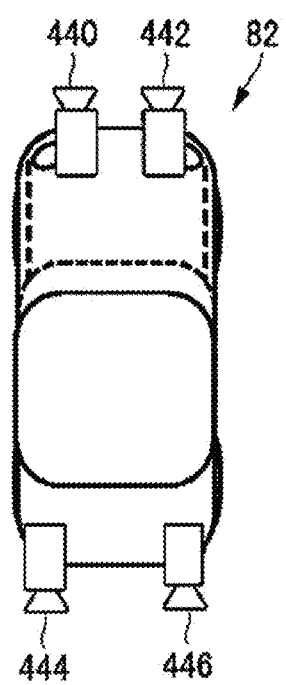
FIG. 13 is a schematic diagram illustrating an example of a mounting position of a camera in the vehicle.

Referring to FIG. 11, in this example, sensor type numbers 0, 1, and 2 are assigned to the millimeter wave radar, the LiDAR, and the camera, respectively, according to the type of the sensor. Further, as illustrated in FIG. 12, a sensor position type number is assigned according to a sensor position type (front and rear, left and right). In the example illustrated in FIG. 12, 0 is assigned when the sensor position is the front, 1 is assigned when the sensor position is the rear, 0 is assigned when the sensor position is the left, and 1 is assigned when the sensor position is the right. In this example, the sensor position is a combination of the front and rear and left and right. That is, in the case of the camera, as illustrated in FIG. 13, when the sensor type number and the front, rear, left, and right of the sensor position type described above are combined for a front left camera 440, a front right camera 442, a rear left camera 444, and a rear right camera 446 of the vehicle 82, the following codes are assigned to each camera.

| | |
|---|---|
| Camera 440 | 200 |
| Camera 442 | 201 |
| Camera 444 | 210 |
| Camera 446 | 211 |

Using this code, it is possible to determine which camera should be selected when only two of the four cameras are adopted. Hereinafter, the method will be described. The following description relates to a method of determining a magnitude of a value of image data obtained from each camera, selecting a code according to the value, and adopting a camera corresponding to the code.

Figure 14:
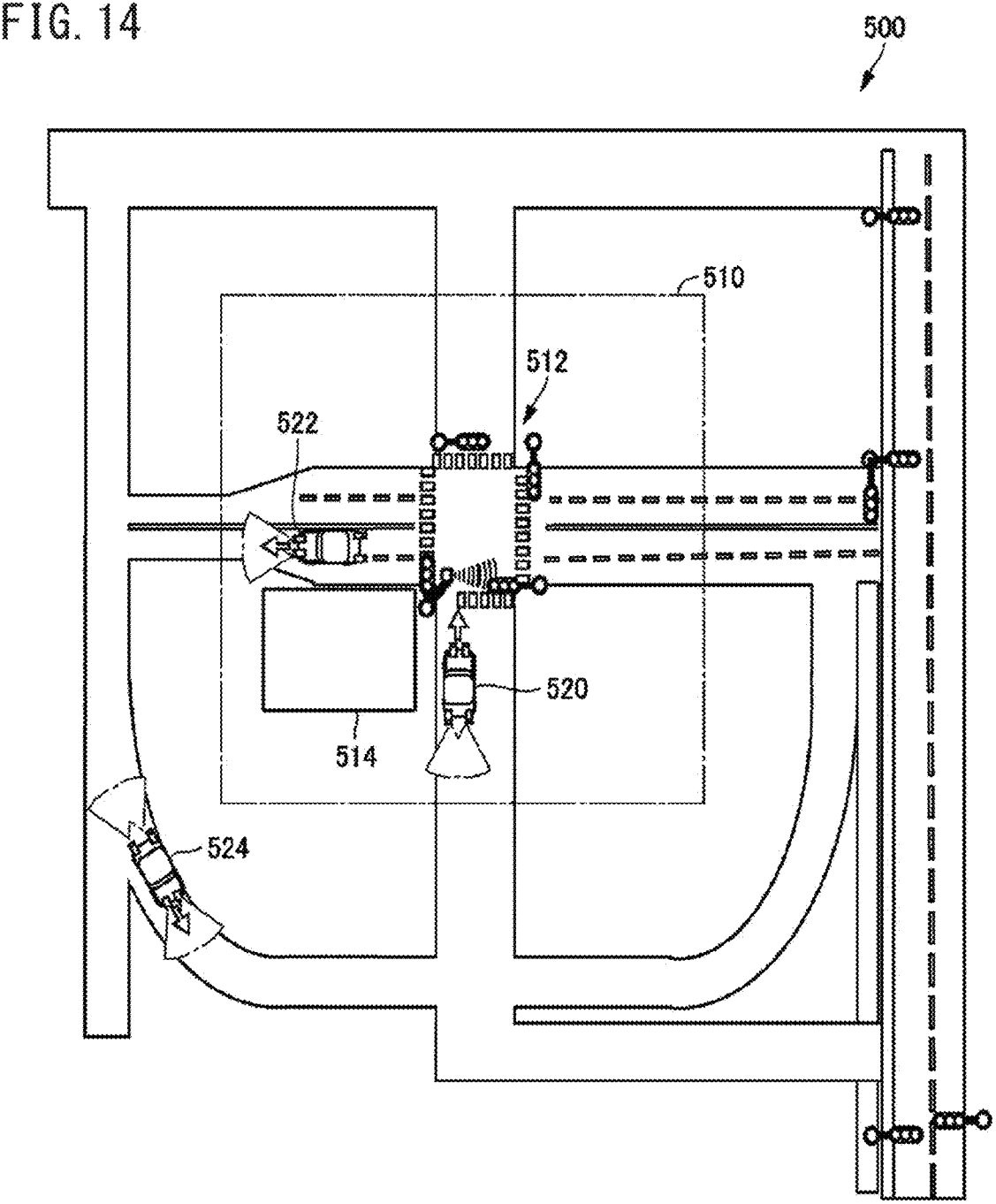
FIG. 14 is a diagram for describing priority of a sensor based on a value of sensor data.

Referring to FIG. 14, a target area 50) managed by the real space 50 is considered, and an intersection 512 is assumed to be present therein. It is assumed that a building 514 is present in the vicinity of the intersection 512, and a base station for high-speed data communication is present in the building 514. Therefore, it is assumed that the high-speed communication is possible in the high-speed communication area 510 around the intersection 512, but only low-speed communication is available in other areas. This information is obtained by the communication situation map 152 illustrated in FIG. 3. In addition, it is known that an infrastructure sensor is provided at the intersection 512. This information can also be seen from the traffic situation bird's-eye view map 150 illustrated in FIG. 3.

In this state, it is assumed that the vehicle is traveling toward the intersection 512 in the high-speed communication area 510 as indicated by a vehicle 520 illustrated in FIG. 14. The infrastructure sensor is provided at the intersection 512 as described above, and the information is transmitted to the edge server 128 at a high speed. Therefore, even if the vehicle 520 transmits the image data of the vicinity of the intersection 512 to the edge server 128, the overlap between the detection range of the camera of the vehicle 520 and the detection range of the infrastructure camera is large, and data overlaps and is useless. On the other hand, there is no infrastructure sensor behind the vehicle 520. Therefore, even if there is no overlap between the detection range of the camera of the vehicle 520 and the detection range of the surrounding infrastructure camera or the overlap therebetween is very small, the use value is high when the image data obtained by the camera behind the vehicle 520 is transmitted to the edge server 128. Furthermore, since the vehicle 520 is in an area capable of high-speed communication, an HD image or a full HD image can be used as an image.

Furthermore, a vehicle 522 traveling in a direction away from the intersection 512 in the high-speed communication area 510 is considered. In this case, for the same reason as the vehicle 520, the rear image of the vehicle 522 has a low value for the edge server 128. On the other hand, the image in front of the vehicle 522 has a high value for the edge server 128. Since the vehicle 522 is also in an area capable of high-speed communication, an HD image or a full HD image can be used.

Furthermore, a vehicle 524 traveling on a road outside the high-speed communication area 510 is considered. Since the vehicle 524 is in the low-speed communication area, an SD image should be used as an image. In addition, since there is no infrastructure camera in the vicinity of the vehicle 524, both the front image and the rear image of the vehicle 524 are useful for the edge server 128.

As described above, in this embodiment, a camera that sets a value of an image from the camera from which an image not overlapping with an image obtained by the infrastructure camera can be obtained to be high and sets a value of an image from the camera from which the image not overlapping with the image obtained by the infrastructure camera can be obtained to be low is selected. That is, in this embodiment, a value of an image from the camera from which an image complementing the detection range of the infrastructure camera can be obtained is evaluated to be high, and a value of an image overlapping the detection range of the infrastructure camera is evaluated to be low.

Therefore, for example, it is assumed that any of the vehicles 520, 522, and 524 is equipped with four LiDARs, millimeter wave radars, and cameras as illustrated in FIG. 6, and how to determine the sensor priority policy table 404 illustrated in FIG. 10 will be described below.

The sensor type is denoted by reference signs illustrated in FIG. 11, and the positions (front and rear, left and right) of each sensor are denoted by reference signs illustrated in FIG. 12 These are coded in the order (sensor type, front and rear, left and right). The same applies to sensors other than the camera.

For example, in the case of the vehicle 520, a rear camera is adopted regardless of the left or right camera. That is, two of the four cameras are adopted. Since the vehicle 520 is in an area capable of high-speed communication, the sensor data set in this case is the identification number "6" illustrated in FIG. 9. In this case, when codes of 12 sensors are sorted in descending order, the 12 sensors are arranged in the following order.

211
210
201
200
111
110
101
100
011
010
001
000

The lower four of these are millimeter wave radars, and all are adopted in the sensor data set of identification number 6. The middle four are a LiDAR, and all of them are adopted. Of the top four cameras, the first 2 "211" and "210" refer to the rear cameras of the vehicle 520. Since only two cameras are adopted in the sensor data set of identification number 6, the top two cameras are adopted and the other cameras are not adopted.

Similarly, in the case of the vehicle 522, as a result of sorting the codes in ascending order, only "200" and "201" having higher code values are adopted. In the case of the vehicle 524, all the cameras are adopted without sorting.

In this way, each sensor is coded, and a desired sensor can be selected by sorting the codes in ascending order when the value of the front sensor is high and sorting the codes in descending order when the value of the rear sensor is high.

In this embodiment, the entire codes are sorted in ascending order or descending order. However, the present disclosure is not limited to such embodiments. By sorting second and third digits of the code in ascending order and descending order using different keys, it is possible to select a sensor based on values determined for both the front and rear and the left and right.

<<Program for Implementing Edge Server 128>>

Figure 15:
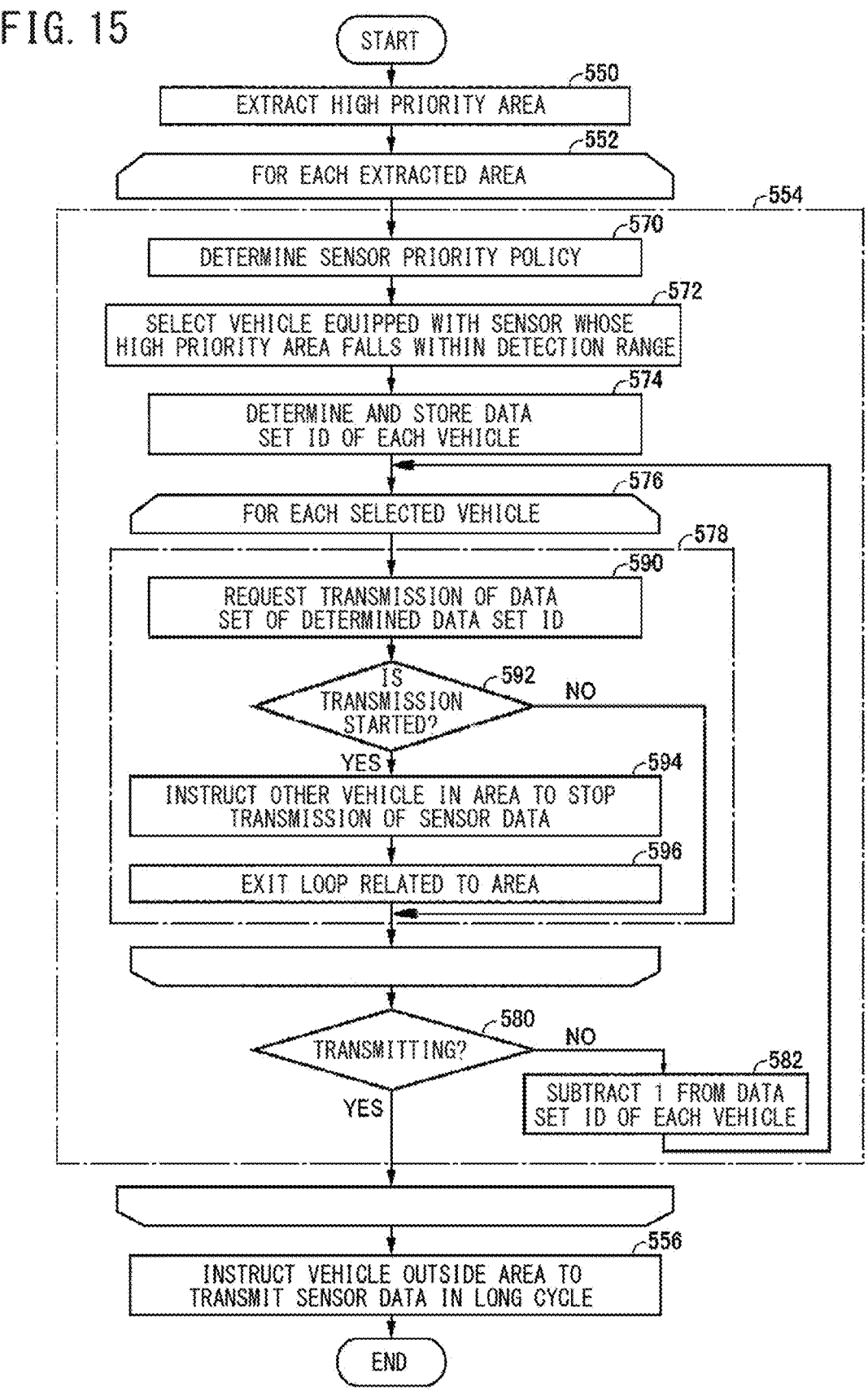
FIG. 15 is a flowchart illustrating a control structure of a program for controlling communication from a vehicle, executed by the traffic assistance server according to the first embodiment of the present disclosure.

FIG. 15 illustrates, in a flowchart form, a control structure of a program that causes a computer to implement a process of requesting a specific vehicle in each of the areas to transmit sensor data and collecting the sensor data in the edge server 128. This program repeatedly operates at predetermined time intervals in parallel with a program for creating a traffic situation bird's-eye view map and a program for creating a communication situation map.

Referring to FIG. 15, the program includes a step 550 of extracting a high priority area from areas for which the edge server 128 is in charge according to the above-described criterion, a step 552 of executing the following process 554 for each area extracted in step 550, and after the termination of the step 552, a step 556 of instructing a vehicle that does not exist in any high priority area to transmit sensor data in a cycle (including the case of transmission stop) longer than that of a vehicle that transmits sensor data from within the high priority area and terminating the execution of the program.

The process 554 includes a step 570 of determining a sensor priority policy according to a nature of an area to be processed, a step 572 of calculating a detection range of a sensor of the vehicle from data transmitted from a vehicle present in the area to be processed, and selecting, as a vehicle candidate, a vehicle equipped with a predetermined sensor, which is a vehicle that includes the area to be processed in the detection range of the sensor or a vehicle whose area to be processed is likely to fall within the detection range of the sensor in the near future, based on a moving speed and direction of the vehicle, a step 574 of determining, for each vehicle selected in step 572, an identification number of a sensor data set based on a sensor data set table received from the vehicle according to the sensor priority policy determined in step 570, a step 576 of executing a process 578 of attempting to receive sensor data on each vehicle, and a result of executing the step 576, a step 580 of determining whether the reception of the sensor data set has started from a target vehicle and branching a flow of control according to the determination, and in response to a negative determination in step 580, a step 582 of subtracting 1 from an identifier value of the sensor data set transmitted to each vehicle and returning control to the step 576. When the determination in step 580 is affirmative, it means that the sensor data for the target area is received, so that the process 554 for the area is terminated and the processing proceeds to the processing for the next area.

The process 578 includes a step 590 of transmitting the identifier of the sensor data set determined in step 574 for the target vehicle and requesting the target vehicle to transmit the corresponding sensor data set, a step 592 of determining whether the transmission starts and branching the flow of control according to the determination, as a result of the process of step 590, a step 594 of transmitting an instruction to stop transmitting the sensor data to other vehicles present in the high priority area being processed in response to the affirmative determination in step 592, and a step 596 of exiting the loop process of process 578 related to the high priority area being processed. When the determination in step 592 is negative (a request to lower the identifier of the sensor data set by 1 is received from the target vehicle), the process 578 is terminated, and the process 578 starts for the next vehicle among the candidate vehicles in the high priority area to be processed.

Although the process 554 is performed for each area, there may be a plurality of candidate vehicles in the area. In such a case, it is preferable to execute the process 578 in descending order from the vehicle considered to have highest efficiency with which the sensor data can be collected. For example, candidate vehicles are sorted by using criteria such as the order in which the types of mounted sensors are large, the order in which the transmission capacity is large, and the order in which the round trip time ((RTT), time from when a signal is emitted to when a response is returned) is small, and the like, and process 578 is executed in descending order of rank. Of course, the present disclosure is not limited to such a method, and for example, a vehicle can be selected in a random order, or a vehicle can be selected in an order in which the time expected to be present in the high priority area is long.

When the reception of the sensor data starts for all the high priority areas, the control proceeds to step 556, and the sensor data transmission in a long cycle is instructed to the vehicle present outside the high priority area, and the process is terminated. For the identifier of the sensor data set transmitted from each vehicle at this time, a predetermined identifier may be designated, or an identifier may be selected on a vehicle side according to the communication speed of the area of the position where each vehicle is present.

<<Program for Implementing In-Vehicle/Out-Vehicle Cooperation Unit 164>>

Figure 16:
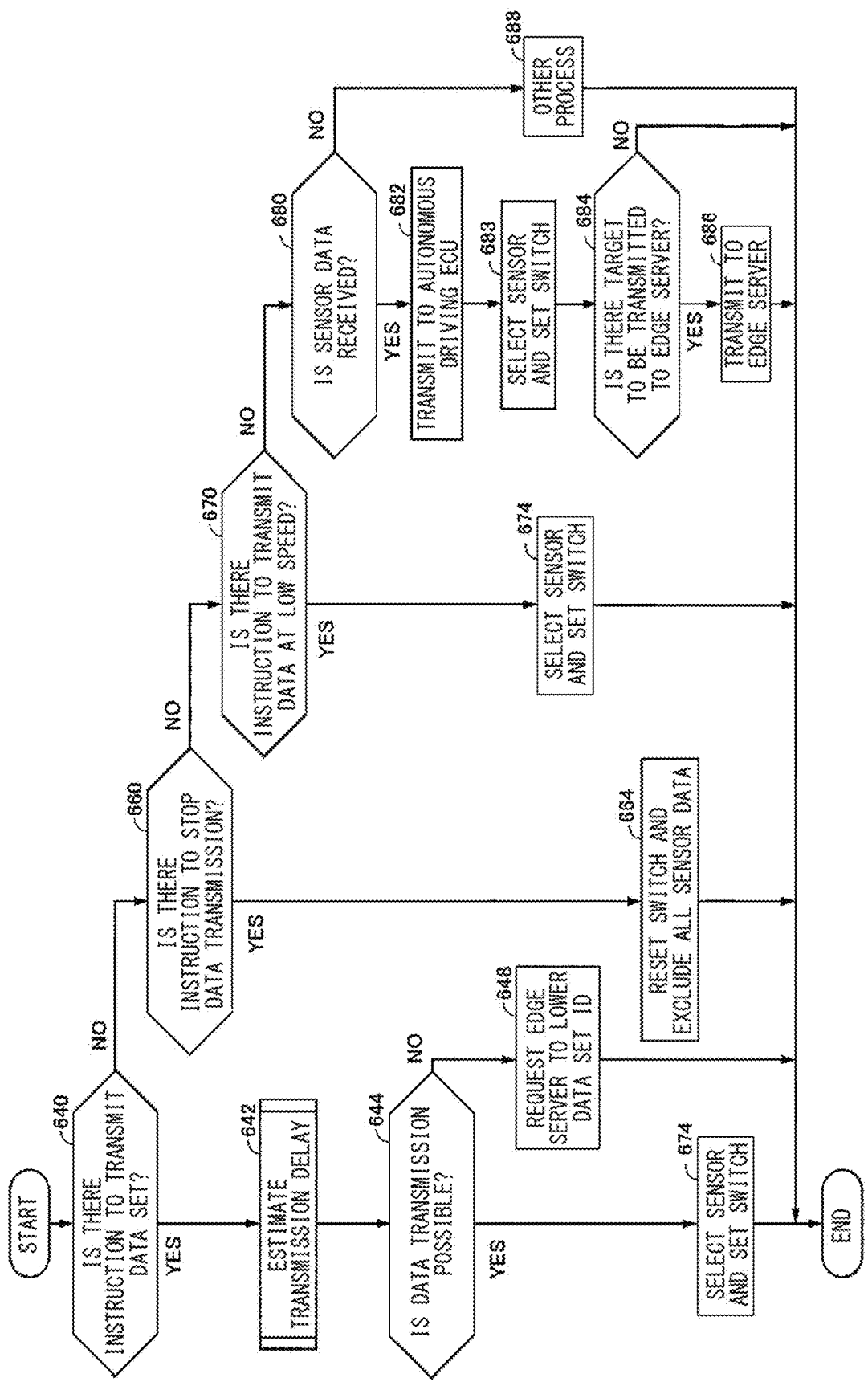
FIG. 16 is a flowchart illustrating a control structure of a program for controlling transmission of sensor data, executed by an in-vehicle device mounted on the vehicle in the traffic assistance system according to the first embodiment.

Referring to FIG. 16, a program executed by the computer to implement the in-vehicle/out-vehicle cooperation unit 164 illustrated in FIG. 6 is executed when some event is received in the in-vehicle/out-vehicle cooperation unit 164. Here, it is assumed that an event includes an interrupt for the CPU.

The program includes a step 640 of determining whether the received event is an instruction to transmit a sensor data set and branching the flow of control according to the determination. The transmission instruction of the sensor data set received in step 640 includes an identifier of any sensor data set in the sensor data set table of the vehicle equipped with the in-vehicle device executing the program.

The program further includes a step 642 of estimating, in response to the determination in step 640 being affirmative, a transmission delay required to transmit the designated sensor data set to the edge server 128 based on available wireless transmission capacity, network delay in a vehicle, processing by the CPU or the like, a step 644 of determining, based on the transmission delay estimated in step 642, whether the designated sensor data set can be transmitted to the edge server 128, that is, whether the transmission delay calculated in step 642 is less than or equal to an allowable delay, 644 and branching the flow of control according to the determination, a step 650 of selecting, in response to the determination in step 644 being affirmative, a sensor constituting sensor data defined by the designated identifier, and for the network switches 292, 294, 296, 298, the first multi-gigabit switch 300, and the second multi-gigabit switch 302 in the in-vehicle network 288, setting the sensor data from the selected sensor to be preferentially transmitted, and terminating the execution of the program, and a step 648 of requesting, in response to the negative determination in step 644, the edge server 128 to lower the value of the identifier of the data set to be transmitted by a predetermined number (for example, 1), and terminating the execution of the program.

The program further includes a step 660 of determining, in response to the negative determination in step 640, whether the received contents are an instruction to stop data transmission from the edge server 128 and branching the flow of control, and a step 664 of, in response to the negative determination in step 660, resetting each switch in the in-vehicle network 288 (see FIG. 6) from the state set in step 650 to the default state, and terminating the execution of the program.

Further, the program includes a step 670 of determining, in response to the negative determination in step 660, whether the received data is an instruction from the edge server 128 indicating that the sensor data is to be transmitted at a low speed, and branching the flow of control according to the determination, and a step 674 of reselecting, in response to the affirmative determination in step 670, the sensor data to be transmitted at a low speed, and setting each switch in the in-vehicle network 288 (see FIG. 6) to preferentially transmit the transmission of the sensor data from the selected sensor, and terminating the execution of the program.

The program further includes a step 680 of determining, in response to the negative determination in step 670, whether the received data is sensor data from a sensor mounted on the vehicle and branching the flow of control according to the determination, a step 682 of transmitting, in response to the affirmative determination in step 680, the received sensor data to the autonomous driving ECU 172 (see FIG. 6), a step 683 of performing a selection of a sensor and setting of a switch according to a priority policy after step 682, a step 684 of determining whether the sensor data received in step 680 is transmitted to the edge server 128 and branching the flow of control according to the determination result after step 683, a step 686 of transmitting, in response to the fact that the determination in step 684 is affirmative, the sensor data received in step 680 is transmitted to the edge server 128 and terminating the execution of the program, and a step 688 of performing, in response to the negative determination in step 680, the processing according to the received data to terminate the execution of the program. When the determination in step 684 is negative, the execution of the program is terminated without doing anything.

In this embodiment, in steps 650, 664, and 674, the presence or absence of the transmission of the sensor data to the edge server 128 and the transmission rate are confirmed before the transmission of the sensor data, and the priority of the switch is set and transmitted as necessary according to the confirmation result. When the transmission is unnecessary, the sensor data is not transmitted. Specifically, in this embodiment, the data output unit from each sensor is instructed to add, to a packet of sensor data from a predetermined sensor, information indicating that the packet is to be added to any priority queue of each switch set according to the priority policy. As a result, whether to transmit sensor data and which sensor data to transmit are controlled substantially in real time.

Figure 17:
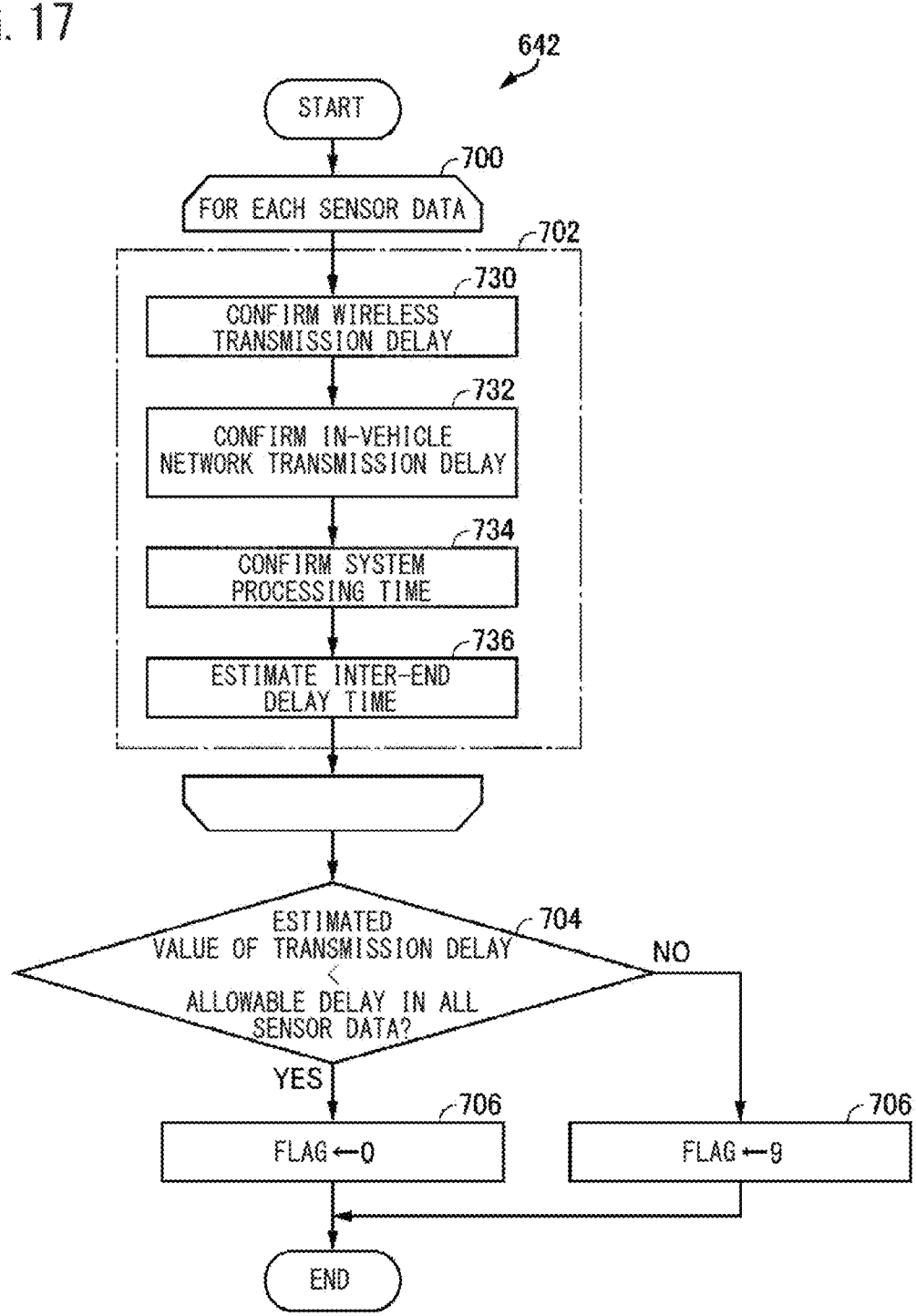
FIG. 17 is a flowchart illustrating a control structure of a program for estimating a transmission delay, executed by the in-vehicle device mounted on the vehicle in the traffic assistance system according to the first embodiment.

FIG. 17 illustrates a control structure of the program executed in step 642 of FIG. 16 in a flowchart form. Referring to FIG. 17, the program includes a step 700 of executing a process 702 of estimating, for each sensor data mounted on a vehicle, a delay time between ends from a sensor that is an output source of sensor data to a transmission destination (that is, the edge server 128), and a step 704 of determining whether an estimated value of a transmission delay is smaller than an allowable delay time for all the sensor data as a result of step 700 and branching the flow of control according to the determination result.

The program further includes a step 706 of, in response to the affirmative determination in step 704, setting 0 to a flag indicating whether the sensor data can be transmitted to the edge server 128 within the allowable delay time and terminating the execution of the program, and a step 708 of, in response to the negative determination in step 704, setting 9 to the flag and terminating the execution of the program. In step 644 of FIG. 16, when the flag is 0, it is determined that the sensor data can be transmitted, and when the flag is 9, it is determined that the sensor data cannot be transmitted.

The process 702 of FIG. 17 includes a step 730 of confirming (estimating) a transmission capacity (in this case, a wireless transmission delay) from the in-vehicle/out-vehicle cooperation unit 164 to the edge server 128, a step 732 of confirming (estimating) a transmission delay of data from a processing target sensor to the TCU 290 in the in-vehicle network 288 illustrated in FIG. 6, a step 734 of confirming (estimating) a system processing time required by the CPU 340 (see FIG. 7) and the TCU 290 to transmit sensor data, and a step 736 of estimating a delay time caused in transmission from the sensor to the edge server 128 for the processing target sensor data by summing steps 730, 732, and 734 and terminating the process 702.

The radio transmission delay that becomes a problem in step 730 is largely caused by a variation in the transmission capacity of the radio communication used by the TCU 290 in FIG. 6. The transmission capacity of wireless communication may greatly vary due to switching between 4G communication and 5G communication, due to shadowing by a large vehicle, and the like. In step 730, for example, an observation result obtained when data communication was actually performed between the vehicle and the edge server 128 most recently may be used as the transmission delay.

The transmission delay is calculated by the following equation.

$$\text{Wireless transmission delay} = \text{Sensor data amount/line speed} + \text{In-vehicle network transmission delay} + \text{System processing time} + \text{Margin}$$

The in-vehicle network transmission delay and the system processing time may be tabulated based on the latest observation result. Alternatively, the margin may be set including the in-vehicle network transmission delay and the system processing time.

When the delay time is calculated in this manner, it is necessary to synchronize a timer maintained and managed by the vehicle 82 with an external reference timer. For example, in a case where the line speed is determined based on the time required for data transmission from the edge server 128 to the vehicle, an accurate transmission delay cannot be calculated unless the timer of the vehicle and the timer of the edge server 128 are synchronized with each other. Therefore, the timer 350 illustrated in FIG. 7 synchronizes with an external time based on a protocol such as network time protocol (NTP), audio-video bridging (AVB), or time-sensitive networking (TSN). In addition, a timer of each unit in the vehicle is also synchronized with the timer 350 so as not to cause inconvenience in calculation of a transmission delay or the like.

The transmission delay of the in-vehicle network refers to the sum of the time until the sensor data from each sensor arrives at the in-vehicle/out-vehicle cooperation unit 164 in FIG. 6 and the time until the sensor data arrives at the TCU 290 from the in-vehicle/out-vehicle cooperation unit 164. The processing time of the CPU refers to the processing time required for the processing for transmitting the sensor data to the edge server 128 by the CPU 340 illustrated in FIG. 7. Since the in-vehicle/out-vehicle cooperation unit 164 controls the vehicle, it is necessary to have a margin for the in-vehicle control as resources of the in-vehicle network and the CPU. It is easy to confirm the state of the transmission capacity and the in-vehicle network, and it is also easy to estimate the influence on the transmission of the sensor data. However, the CPU resources are easily affected by other processing, and it is difficult to estimate the CPU resources more than other two factors since the CPU resources are not clearly known unless actual sensor data transmission starts. Therefore, processing of transmitting sensor data under various conditions may be executed, and CPU resources consumed as a result may be actually measured and held in a form of a table or the like.

Figure 18:
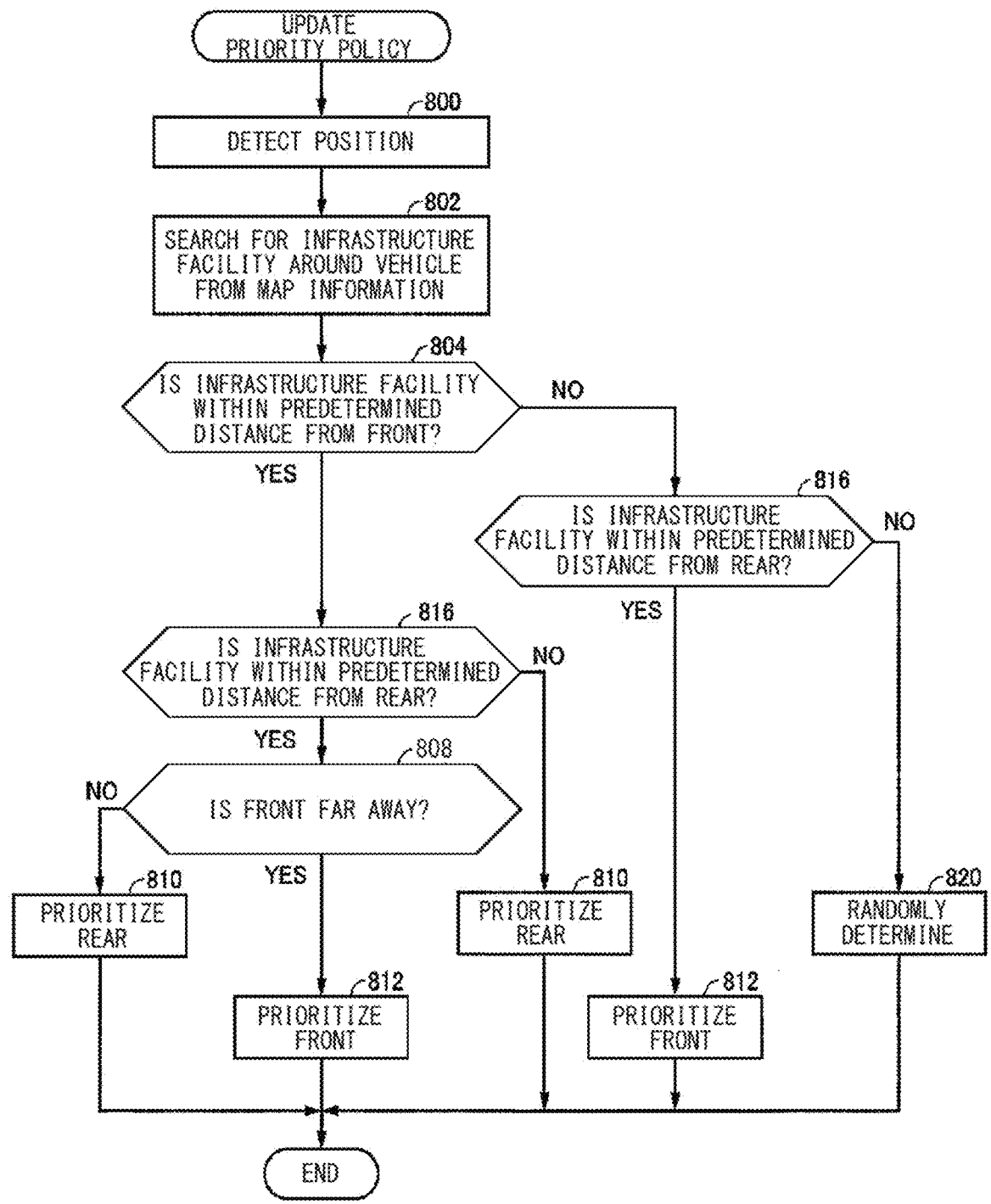
FIG. 18 is a flowchart illustrating a control structure of a program for updating a priority policy of a sensor, executed by the in-vehicle device mounted on the vehicle in the traffic assistance system according to the first embodiment.

FIG. 18 is a flowchart illustrating a control structure of a program for implementing priority policy update processing executed by the CPU 340 of the in-vehicle/out-vehicle cooperation unit 164 illustrated in FIG. 7 in response to an interrupt signal generated by the timer 350 at predetermined time intervals. Referring to FIG. 18, the program includes a step 800 of detecting a position of a host vehicle from an output of a global positioning system (GPS) or the like, a step 802 of searching for an infrastructure sensor facility present around the host vehicle from map information based on the step 800, and a step 804 of determining whether the infrastructure sensor searched in step 802 is within a predetermined distance in front of the host vehicle and branching a flow of control in response to the determination result.

The program further includes a step 806 of determining whether an infrastructure sensor is further present within a predetermined distance behind the host vehicle and branching the flow of control based on the determination result when the determination in step 804 is affirmative, a step 808 of comparing the distance to the front infrastructure sensor and the distance to the rear infrastructure sensor, executed when the determination in step 806 is affirmative, determining whether the front infrastructure sensor is farther, and branching the flow of control in response to the determination; a step 812 of determining to prioritize the front among the sensors mounted on the host vehicle and terminating the execution of the program when the determination in step 808 is affirmative, and a step 810 of determining to prioritize the rear among the sensors mounted on the host vehicle and accommodating the execution of the program when the determination in step 808 is negative.

The program further includes a step 814 of determining to prioritize a rear sensor in response to the negative determination in step 806 and terminating the execution of the program; a step 816 of determining whether an infrastructure sensor is present within a predetermined distance behind the host vehicle in response to the negative determination in step 804 and branching the flow of control according to the determination, a step 818 of determining to prioritize a front sensor among the sensors mounted on the host vehicle in response to the affirmative determination in step 816 and terminating the execution of the program, and a step 820 of randomly setting a priority of the sensors mounted on the host vehicle executed when the determination in step 816 is negative and terminating the execution of the program.

By executing the program, sorting the codes of the sensors in ascending order or descending order according to the priority order as described above, and further selecting sensors with high priority order for each sensor type by the number of sensors determined by the sensor data set, the sensor priority policy table 404 for determining the sensor data set to be transmitted to the edge server 128 is obtained. This program is repeated every predetermined time, and the sensor priority policy table 404 is updated each time. Therefore, when this predetermined time is made sufficiently short, the appropriate sensor priority policy table 404 can be always obtained substantially in real time according to the position of the vehicle and the surrounding situation.

Figure 19:
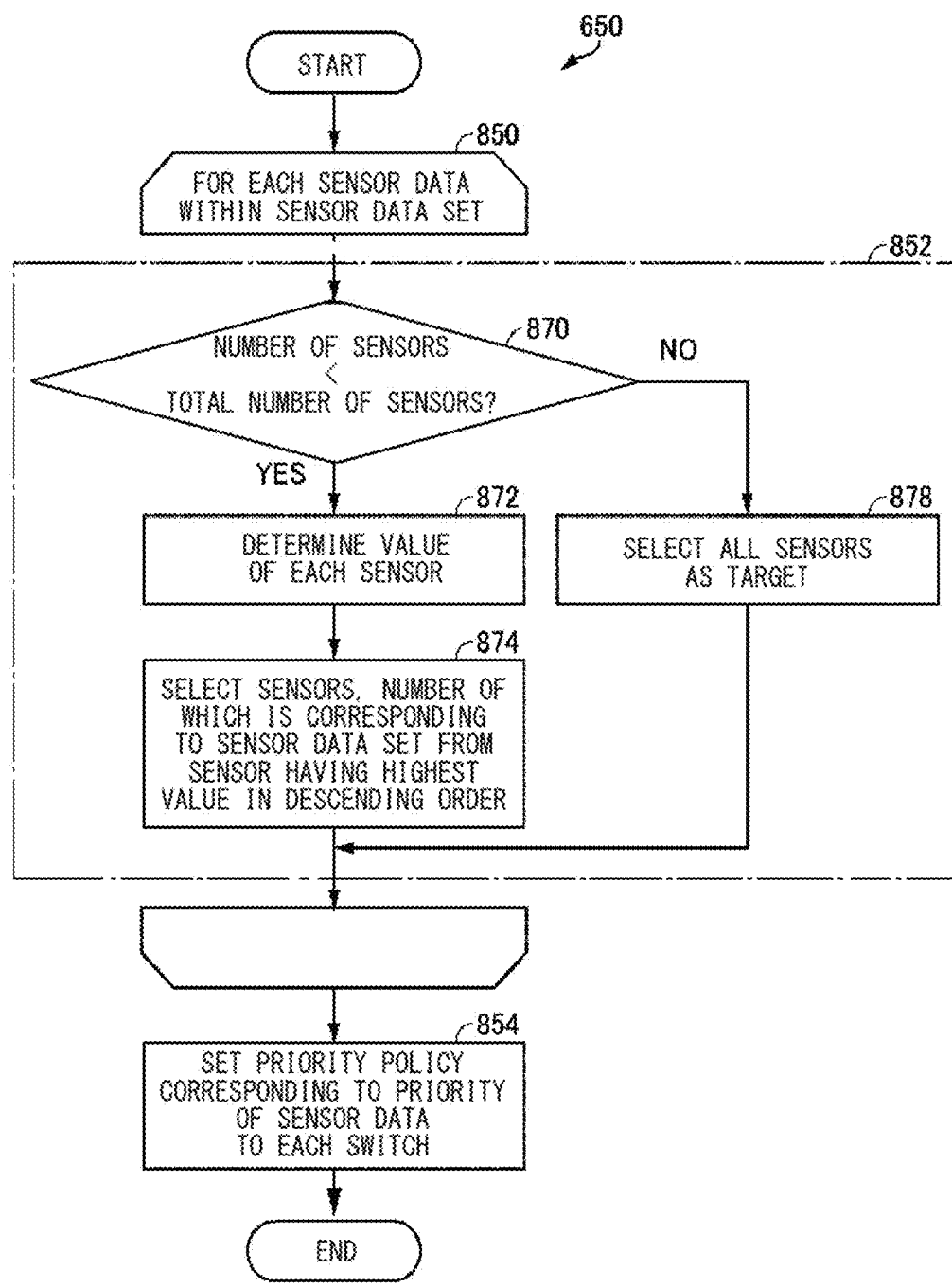
FIG. 19 is a flowchart illustrating a control structure of a program for implementing a selection of sensor data and setting processing of a switch, executed by the in-vehicle device mounted on the vehicle in the traffic assistance system according to the first embodiment.

FIG. 19 is a flowchart illustrating a control structure of a program for implementing step 650 in FIG. 16. Referring to FIG. 19, the program includes a step 850 of selecting a sensor that outputs sensor data to be transmitted to the edge server 128 for each sensor type by executing the following process 852 on each sensor data in the sensor data set specified by the identifier received from the edge server 128, and a step 854 of setting a priority policy of packet transmission corresponding to the priority determined in step 850 to each switch (or an output unit of each sensor) and terminating the execution of the program.

The process 852 includes a step 870 of determining whether the number of sensors defined in the designated sensor data set is smaller than the number of sensors mounted on the vehicle, which are sensors of the sensor type of the processing target and branching the flow of control according to the determination, a step 872 of determining the values of each sensor by the sensor priority policy table 404 when the determination in step 870 is affirmative, a step 874 of selecting sensors, the number of which is designated for the sensor type of the processing target by the sensor data set designated from the sensor having the highest value in descending order after step 872, and a step 878 of selecting all the sensors of the sensor type of the processing target in response to the negative determination in step 870 and terminating the process 852.

<Operation>

Referring to FIG. 6, each of the sensors included in the sensor units 280, 282, 284, and 286 outputs sensor data corresponding to the surrounding situation. These sensor data are transmitted to the in-vehicle/out-vehicle cooperation unit 164 via the network switches 292, 294, 296, and 298, the first multi-gigabit switch 300, the second multi-gigabit switch 302, and the like, respectively. Among the sensors, the LiDAR measures a distance to a grid point of a portion facing the LiDAR of a moving body present in a predetermined range around the LiDAR, and outputs a distance measurement signal as a point cloud that is a set of three-dimensional position coordinates of each point. The millimeter wave radar measures a distance to a moving object present in the surroundings and outputs a signal thereof. The camera captures an image in an imaging range at a predetermined frame rate. Among the images, an image (SD image, HD image, full HD image) in a range including the central portion of the image and designated by the sensor data set is output. These pieces of sensor data are transmitted to the autonomous driving ECU 172 illustrated in FIG. 6, but among these pieces of sensor data, data of a sensor designated by a sensor data set designated by the edge server 128 is also transmitted to the edge server 128. When the sensor data set is determined, the edge server 128 and the in-vehicle/out-vehicle cooperation unit 164 operate as follows.

The timer 350 illustrated in FIG. 7 generates timer interruption every predetermined time and provides an interrupt signal to the CPU 340. In response to the interrupt signal, the CPU 340 executes a program indicating a control structure in FIG. 18. By periodically executing this program, the priority policy for determining the priority when selecting a sensor among the plurality of sensors included in the vehicle according to the sensor data set is updated in real time according to the relationship between the vehicle and the surrounding infrastructure sensor.

As described above, the reception processing unit 210 of the edge server 128 receives the signals from the plurality of infrastructure sensor facilities 180 and the signals from the sensors 170 mounted on the vehicle 82, provides the signals from the LiDAR and the millimeter wave radar to the moving object tracking unit 212, and provides the image data from the camera to the attribute detection unit 216. On the other hand, the reception processing unit 210 provides information indicating the position, speed, and traveling direction of the vehicle among the information received from the sensor 170 to the vehicle tracking unit 220. The vehicle tracking unit 220 maintains data indicating the current position and the moving direction of each vehicle based on the received information. Note that coordinates representing the detection range of the sensor mounted on the vehicle are transmitted from each vehicle to the edge server 128. The vehicle information storage unit 222 stores such information along with the coordinates of each vehicle.

The moving object tracking unit 212 of the edge server 128 analyzes the distance measurement signal from LiDAR or the like received from the reception processing unit 210 to determine the positions of each moving object in a first cycle. The time required for this analysis is short, and the moving object tracking result 213 is updated in the first cycle. The attribute detection unit 216 determines an attribute of a moving body such as a vehicle or a person in the image by performing image analysis on the image data received from the reception processing unit 210. Since image processing takes time, the cycle of attribute detection by the attribute detection unit 216 is a second cycle longer than the update cycle of the moving object tracking result 213 by the moving object tracking unit 212. The attribute 217 of the attribute detection unit 216 is stored in the attribute storage unit 218.

Referring to FIG. 5, the reception processing unit 210 receives sensor data and vehicle data from the infrastructure sensor facility 180, the vehicle 82, and the like in the target area. The moving object tracking unit 212 detects the position of the moving object in the target area from the data and tracks the movement. The tracking result is stored in the moving object tracking result storage unit 214. Similarly, the attribute detection unit 216 detects the attribute of each moving object. The attribute of the detected moving object is stored in the attribute storage unit 218. The integrated processing unit 224 integrates the tracking result of the moving object and the attribute of the moving object, creates the traffic situation bird's-eye view map 225 using the high definition map stored in the traffic situation bird's-eye view map storage unit 226, and stores the data in the traffic situation bird's-eye view map storage unit 226. The integrated processing unit 224 always updates the traffic situation bird's-eye view map 225 stored in the traffic situation bird's-eye view map storage unit 226 based on the newly received data.

The vehicle tracking unit 220 stores the vehicle information 221 received from each vehicle in the vehicle information storage unit 222. The vehicle tracking unit 220 further tracks each vehicle in the area based on the vehicle information 221 stored in the vehicle information storage unit 222 and the newly received vehicle information 221. The vehicle tracking unit 220 further requests a vehicle newly entering the area to transmit the transmission data set table, and receives the received transmission data set table in the sensor data set table storage unit 248.

When information to be transmitted to each vehicle is generated in the traffic situation bird's-eye view map 225, the information transmission unit 228 generates information to be transmitted to each vehicle from the data stored in the traffic situation bird's-eye view map storage unit 226, and transmits the information to each vehicle via the transmission processing unit 230.

The line speed information storage unit 256 extracts and accumulates, as a set, a transmission time held in the data received by the reception processing unit 210 from each vehicle in the area, a reception time in the edge server 128, and positions of each vehicle stored in the vehicle information storage unit 222. Based on the data accumulated in the line speed information storage unit 256 and the high definition map stored in the high definition map storage unit 262, the communication situation map management unit 258 creates, for each division obtained by dividing the map in a grid pattern, a communication situation map regarding the transmission time between the vehicle and the edge server 128, and stores the communication situation map in the communication situation map storage unit 260. The communication situation map management unit 258 always maintains the communication situation map storage unit 260 in the latest state based on the latest line speed information accumulated in the line speed information storage unit 256.

The high priority area extraction unit 240, the policy determination unit 244, the candidate vehicle selection unit 246, the data set inquiry unit 250, and the vehicle selection unit 252 operate as follows. Referring to FIG. 15, the following processing is repeated in a predetermined time.

First, the edge server 128 extracts a high priority area from among the areas that the edge server 128 is in charge of according to the above-described criteria (step 550). Subsequently, a process 554 is executed in step 552 for each area extracted in step 550.

In the process 554, a sensor priority policy according to the nature of the area to be processed is determined (step 570). Subsequently, in step 572, the detection range of the sensor of the vehicle is calculated from the data transmitted from the vehicle present in the area to be processed, and it is determined whether a vehicle is a vehicle that includes the area to be processed in the detection range of the sensor or a vehicle whose area to be processed is likely to fall within the detection range of the sensor in the near future, and a vehicle equipped with a predetermined sensor, and a vehicle satisfying the conditions is selected as a vehicle candidate. In subsequent step 574, for each vehicle selected in step 572, a sensor data set to be collected from the vehicle is determined and stored according to the sensor priority policy determined in step 570, the communication situation map, and the vehicle information on the sensor mounted on each vehicle.

In step 576, a process 578 is executed for each candidate vehicle selected in step 572. At this time, in this embodiment, the process 578 is executed in descending order from vehicle having the most preferable attribute (type, number, and performance of mounted sensors, data transmission performance, and the like) among the candidate vehicles.

In the process 578, sensor data is transmitted to a target vehicle along with the identifier of the sensor data set determined in step 574.

Referring to FIG. 16, in the vehicle that has received the sensor data, the determination in step 640 is affirmative, step 642 is executed, and a transmission delay when transmitting the designated sensor data set to the edge server 128 is estimated. This process is as illustrated in FIG. 17. That is, the wireless transmission delay (step 730), the in-vehicle network transmission delay (step 732), and the system processing time (step 734) are confirmed (estimated) for each sensor data, and the total delay time between the processing target sensor and the edge server 128 is estimated based on the confirmation. When the estimated value of the transmission delay is less than the allowable delay for all the sensor data, the flag is set to 0 in step 706. When at least one of the sensor data has the estimated value of the transmission delay equal to or more than the allowable delay time, the flag is set to 9 in step 708.

When it is determined in step 644 that the transmission delay calculated in step 642 is less than the allowable delay, and thus, the designated sensor data set can be transmitted to the edge server 128, in step 650, a sensor for transmitting sensor data to the edge server 128 is selected according to the sensor data set, and each switch is set to preferentially transmit the sensor data from that sensor.

That is, with reference to FIG. 19, the processing of the process 852 is executed for each sensor data in the sensor data set corresponding to the identifier designated by the edge server 128. In the process 852, first, it is determined whether the number of sensors designated by the sensor data set for a certain type of sensor is smaller than the number of all sensors equipped in the vehicle. When the determination is negative, all the sensors of the target type mounted on the vehicle are selected as the sensor that transmits the sensor data to the edge server 128 (step 878). When the determination in step 870 is affirmative, in step 872, the values of each sensor are determined according to the priority policy of the sensor at that time, and in step 874, starting from the sensor having a high value, the number of sensors defined by the designated sensor data set is selected. When the sensors are selected for all the sensor types in this manner, each switch is set to preferentially transmit the sensor data from the center selected in step 854.

As a result, the output of the sensor data addressed to the edge server 128 starts from the selected sensor. When the CPU 340 (FIG. 7) receives this sensor data, the sensor data is transmitted to the autonomous driving ECU 172 in step 682 through a path of step 640→step 660→step 670→step 680 in FIG. 16. Further, when the sensor data is to be transmitted to the edge server 128, the sensor data is transmitted to the edge server 128 through a path of step 684→step 686.

Referring again to FIG. 15, in this case, the determination in step 592 is affirmative (flag=0), the processes in steps 594 and 596 are executed, and the process in step 576 is terminated. Since it is determined in subsequent step 580 that the transmission of the sensor data from the target vehicle is being executed, the processing of the target area is terminated, and process 554 is executed for the next high priority area.

If the transmission delay is equal to or longer than the allowable delay time in the vehicle that has requested the transmission of the sensor data set in step 590, the following process is executed.

Referring to FIG. 16, in this case, the process is executed in a path of step 640→step 642→step 644. Since the determination in step 644 is negative, the processing in step 648 is executed. That is, the vehicle transmits information requesting the edge server 128 to lower the identifier of the sensor data set by 1.

Referring back to FIG. 15, in the edge server 128 that has received the request, the determination in step 592 is negative (flag #0). The execution of the process 578 for the target vehicle is terminated, and the process 578 is executed for the next vehicle. When all the candidate vehicles cannot transmit the sensor data within the allowable delay time, the determination in step 580 is negative, and 1 is subtracted from the value of the identifier of the sensor data set of each vehicle in step 582. Then, the process 578 is repeated for each vehicle using the new identifier. Such process is repeated until a vehicle capable of transmitting sensor data is found. Although not illustrated, when transmission is not possible for all the candidate vehicles, the process can be resumed from step 570.

In this way, when the transmission of the sensor data from the selected vehicle starts for all the target high priority areas, step 556 is executed, and an instruction indicating that the sensor data is transmitted in a long cycle is transmitted to the vehicle outside the area.

Referring to FIG. 16, when each vehicle receives this instruction, step 674 is executed through a path of step 640→step 660→step 670 in FIG. 16. In step 674, the selection of the sensor, the data output from the sensor, and the resetting of the switch in the network are performed so as to transmit data sets (in many cases, all sensor data) different from those in step 650 to the edge server 128 in along cycle. As a result, the sensor data is transmitted from the vehicles other than the selected vehicle to the edge server 128 in a long cycle.

Note that an instruction to stop the transmission of the sensor data is transmitted from the edge server 128 to a vehicle other than the vehicle selected in the high priority area. In this case, in these vehicles, the process of step 664 is executed through a path of step 640→step 660 in FIG. 16. That is, step 664 is reset, and all the sensor data is excluded from a target to be transmitted to the edge server 128.

Referring to FIG. 16, the operation of the program executed in each vehicle when the data set transmission instruction, the data transmission stop instruction, and the low-speed data transmission instruction are received is as described above. When the CPU 340 receives the sensor data from the sensor, the CPU transmits the sensor data to the autonomous driving ECU 172 (see FIG. 6) in step 682 through a path of step 640→step 660→step 670→step 680, and transmits the sensor data to the edge server 128 in a case where the sensor data is to be transmitted to the edge server 128 in subsequent steps 684 and 686, and otherwise, the CPU terminates the execution of the program without doing anything.

When it is determined in step 680 that the received data is not sensor data, control passes to step 688 to perform a process according to the received data and terminate the process.

As described above, according to this embodiment, in an area (high priority area) in which a predetermined condition is satisfied, according to the sensor priority policy according to the condition of the area, only the vehicle that can most efficiently transmit the sensor data most effective for creating the traffic situation bird's-eye view map to the edge server 128 within a predetermined allowable delay transmits the sensor data, and the other vehicles do not transmit the sensor data. The amount of data transmitted to the edge server 128 does not become excessive, and the traffic situation bird's-eye view map can also be created and maintained in real time in a timely manner. In the estimation of the transmission delay at this time, in addition to the transmission capacity (line speed) from the transmitting unit of the vehicle to the edge server 128, the transmission delay of the in-vehicle network and the processing time in the CPU are estimated, and then, summed, and compared to the allowable delay by adding an extra margin. As a result, the edge server 128 can collect information necessary for creating and maintaining the traffic situation bird's-eye view map from the vehicle selected in consideration of the line speed with the edge server 128 and the factor of the transmission delay in the vehicle with high probability. As a result, the risk of congestion of communication between the vehicle and the edge server 128 in the target area can also be reduced. In addition, for the target area, a sensor priority policy according to the reason of the target is adopted, and a vehicle that can transmit sensor data in the form conforming to the sensor priority policy is selected. Therefore, the most necessary data can be transmitted to the edge server 128 according to the traffic situation, and the traffic situation bird's-eye view map sufficiently reflecting necessary information can be created.

By a process 702 of FIG. 17, the transmission delay time of the sensor data between the ends from each of the plurality of sensors mounted on the vehicle 82 to the edge server 128 is estimated. By the process illustrated in FIG. 18 and the process of step 872 illustrated in FIG. 19, the value of the sensor data output from the plurality of 82 sensors mounted on the vehicle 82 is determined based on the state of the vehicle including the position and attitude of the vehicle 82, the installation positions of the plurality of sensors mounted on the vehicle 82, and the overlapping state of the detection range of the plurality of sensors and the detection range of the infrastructure sensor. By the process of step 874 of FIG. 19, a part of the sensor data is selected based on the inter-end transmission delay time estimated in the process 702 of FIG. 17 and the value determined by the process of FIG. 18 and step 872 of FIG. 19 according to the position, the traveling direction, and the like of the vehicle 82, and a copy of the sensor data is transmitted to the edge server 128 via the TCU 290 of FIG. 6. The inter-end transmission delay time from the sensor to the edge server 128 is estimated including the delay time in the in-vehicle network, and the sensor data to be transmitted to the edge server 128 is selected based on the estimated transmission delay time and the value determined by the processing of FIG. 18 and step 874 of FIG. 19 for each of the sensor data. Since the in-vehicle/out-vehicle cooperation unit 164 selects and transmits sensor data that can be effectively used by the edge server 128 in consideration of the inter-end transmission delay time from the sensor to the edge server 128 while following the variation in the transmission capacity by the TCU 290, the function of the edge server 128 can be exhibited as much as possible while maximizing the available transmission capacity.

In addition to the processing time in the CPU 340 until the sensor data that has reached the input/output I/F 352 illustrated in FIG. 7 is input to the TCU 290 of FIG. 6 and the communication delay time required for the sensor data to be transmitted from the TCU 290 to the edge server 128, the network delay time until the sensor data from the plurality of sensors reaches the input/output I/F 352 of FIG. 7 via the in-vehicle network 288 illustrated in FIG. 6 is further estimated for each sensor, and the inter-end transmission delay time from each sensor to the edge server 128 is calculated based on the estimation. Since the inter-end transmission delay time is calculated in consideration of the transmission delay time of the in-vehicle network 288, the amount of data that can be transmitted to the edge server 128 within the allowable delay time can be estimated more accurately, and the sensor data to be transmitted can be selected more accurately.

Among the plurality of sensors mounted on the vehicle 82, sensor data from a sensor having a large detection range overlapping with the detection range of the infrastructure sensor has a low use value in the edge server 128. The smaller the detection range of the sensor overlapping with the detection range of the infrastructure sensor, the higher the use value of the sensor data output by the sensor in the edge server 128. Therefore, the detection range of the infrastructure sensor present in the vicinity of the vehicle 82 is estimated by the algorithm illustrated in FIG. 18 described with reference to FIG. 14, and among the sensors, the sensor having a small overlapping range between the detection range and the detection range of the infrastructure sensor is calculated to be high in value and the sensor having a large overlapping range is calculated to be small in value, so the sensor data from these sensors is preferentially selected and transmitted to the edge server 128. Since sensor data having a high value within the limited transmission capacity is transmitted to the edge server 128, the stable processing based on the sensor data can be performed in the edge server 128 regardless of the variation in the transmission capacity. Note that, in the algorithm illustrated in FIG. 18, details of the detection range of the infrastructure sensor are not examined, but the above-described condition is satisfied in that, among the sensors mounted on at least the vehicle 82, a sensor having a low possibility or almost no possibility of overlapping with the infrastructure sensor is selected.

As shown by the algorithm of FIG. 18, the detection range of the infrastructure sensor is updated at predetermined time intervals. The value of the sensor data is also updated at predetermined time intervals based on the position and attitude of the vehicle 82 and the detection range of the infrastructure sensor as illustrated in FIG. 18. Therefore, the value of each sensor of the vehicle 82 is updated at least at predetermined time intervals following the movement of the vehicle 82, the environment around the vehicle 82, and the like. As a result, the sensor data having the high value is transmitted to the edge server 128 regardless of the movement of the vehicle 82, the change in the environment around the vehicle, and the like. Therefore, the edge server 128 can stably perform the process regardless of the distribution of vehicles and the change in the environment.

As illustrated in FIG. 19, the value of the sensor data is set for each type of sensor. Therefore, it is possible to select sensor data effective for the processing of the edge server 128 by more effectively using the transmission capacity.

As can be seen from the algorithm illustrated in FIG. 19, when an identifier designating any of the sensor data sets is provided to the in-vehicle/out-vehicle cooperation unit 164, a sensor data set corresponding to the identifier is determined as illustrated in FIG. 9. The sensors, the number of which is designated by the sensor data set, are selected in descending order of value of the sensor data for each sensor type. For all types of sensors, pieces of sensor data with a value, the number of which is predetermined, are transmitted to the edge server 128 based on the designation by the sensor data set. As a result, the edge server 128 can execute stable processing by effectively using the sensor data.

The autonomous driving ECU 172 illustrated in FIG. 6 operates based on sensor data from a plurality of sensors mounted on vehicle 82. Since the sensor data selected by the in-vehicle/out-vehicle cooperation unit 164 among the sensor data is transmitted to the edge server 128, the sensor data can be shared between the autonomous driving ECU 172 and the edge server 128, and the autonomous driving of the vehicle and the execution of the process of the edge server 128 can be efficiently performed.

Second Embodiment

<Configuration>

Figure 20:
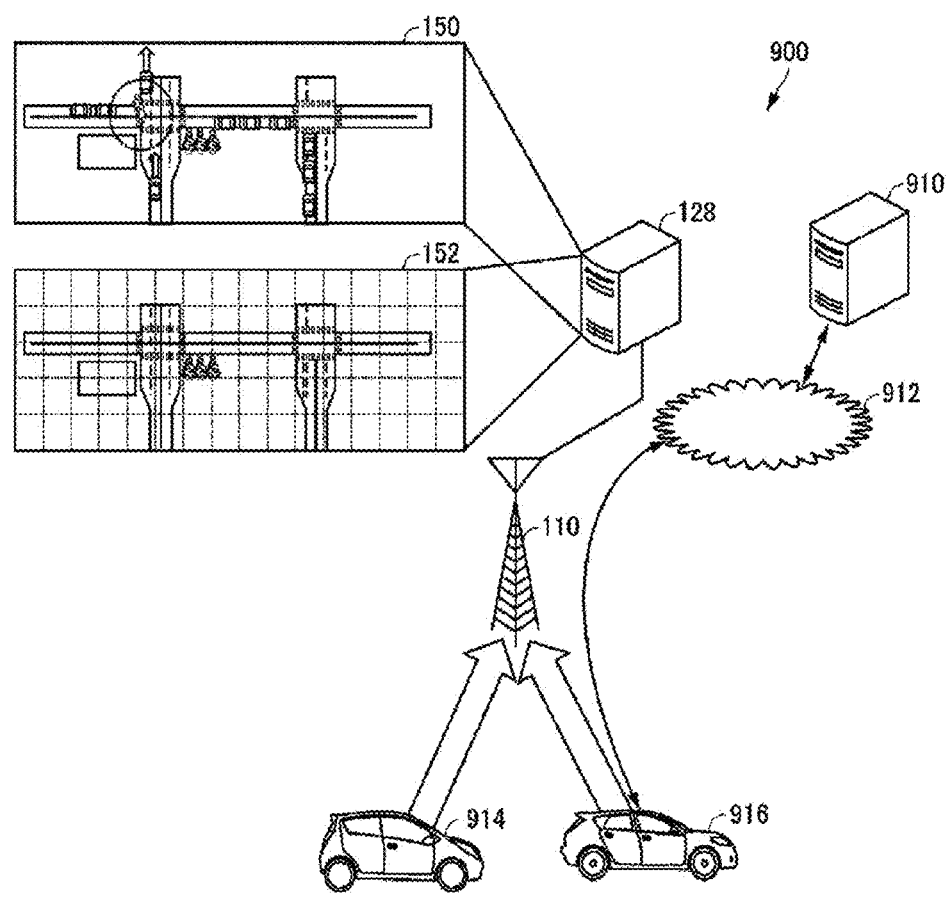
FIG. 20 is a block diagram illustrating a schematic configuration of a traffic assistance system according to a second embodiment of the present disclosure.

In the first embodiment, a part of the sensor data transmitted to the autonomous driving ECU 172 is transmitted to the edge server 128. However, the present disclosure is not limited to such embodiments. Referring to FIG. 20, a traffic assistance system 900 according to a second embodiment includes a vehicle 914 having a configuration similar to that of the vehicle 82 according to the first embodiment, a vehicle 916 that has the same configuration as the vehicle 82 instead of the vehicle 84 in FIG. 4, but is equipped with a remote control ECU (not illustrated) instead of the automatic driving ECU 172 illustrated in FIG. 4 and FIG. 6, and a remote control server 910 that receives sensor data from the vehicle 916 via the Internet 912, generates a signal (remote control command) for controlling the remote control ECU of the vehicle 916 based on the sensor data, and transmits the generated signal to the vehicle 916 via the Internet 912.

Figure 21:
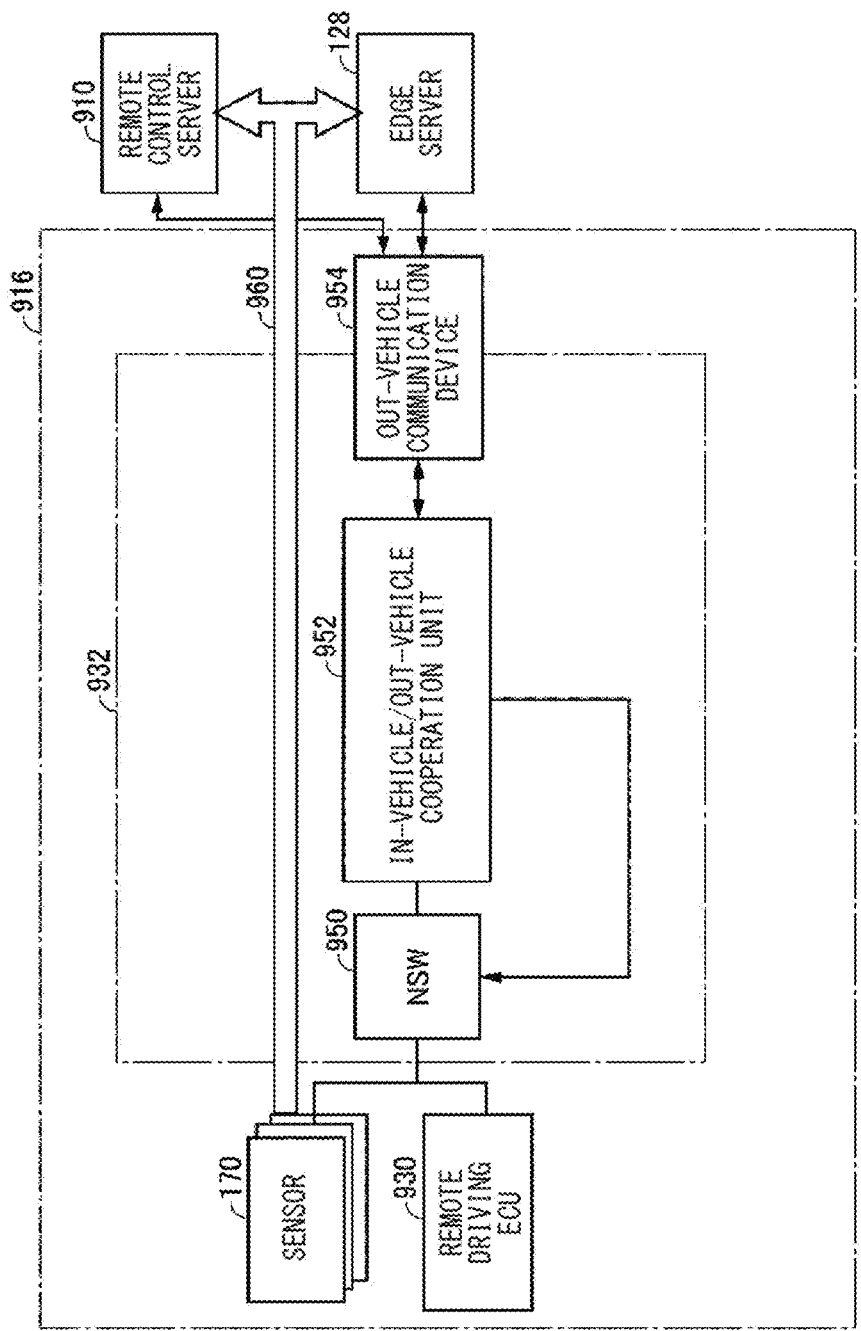
FIG. 21 is a block diagram illustrating a configuration of elements related to the traffic assistance system in a vehicle according to the second embodiment of the present disclosure.

Referring to FIG. 21, the vehicle 916 includes an in-vehicle device 92 instead of an in-vehicle device 932 illustrated in FIG. 4, and a remote control ECU 930 instead of the autonomous driving ECU 172 illustrated in FIG. 4. The in-vehicle device 932 includes an NSW 950, an in-vehicle/out-vehicle cooperation unit 952, and an out-vehicle communication device 954 instead of the NSW 160, the in-vehicle/out-vehicle cooperation unit 164, and the out-vehicle communication device 162 of the in-vehicle device 92. The remote control ECU 930 does not have a function of autonomous driving like the autonomous driving ECU 172, and in this embodiment, the remote control ECU operates only according to a remote control command transmitted from the remote control server 910.

As illustrated in FIG. 21, the in-vehicle device 932 does not transmit the sensor data from the sensor 170 to the remote control ECU 930, but transmits the sensor data to the remote control server 910 via the NSW 950, the in-vehicle/out-vehicle cooperation unit 952, and the out-vehicle communication device 954 as indicated by an arrow 960. The in-vehicle/out-vehicle cooperation unit 952 receives the remote control command transmitted from the remote control server 910 in a reverse transmission path of the sensor data, and provides the remote control command to the remote control ECU 930 via the NSW 950.

In such an embodiment, basically all the sensors 170 are transmitted to the remote control server 910, while a part thereof is transmitted to the edge server 128. To this end, a control structure of a program executed by the CPU of the in-vehicle/out-vehicle cooperation unit 952 is illustrated in FIG. 22.

Figure 22:
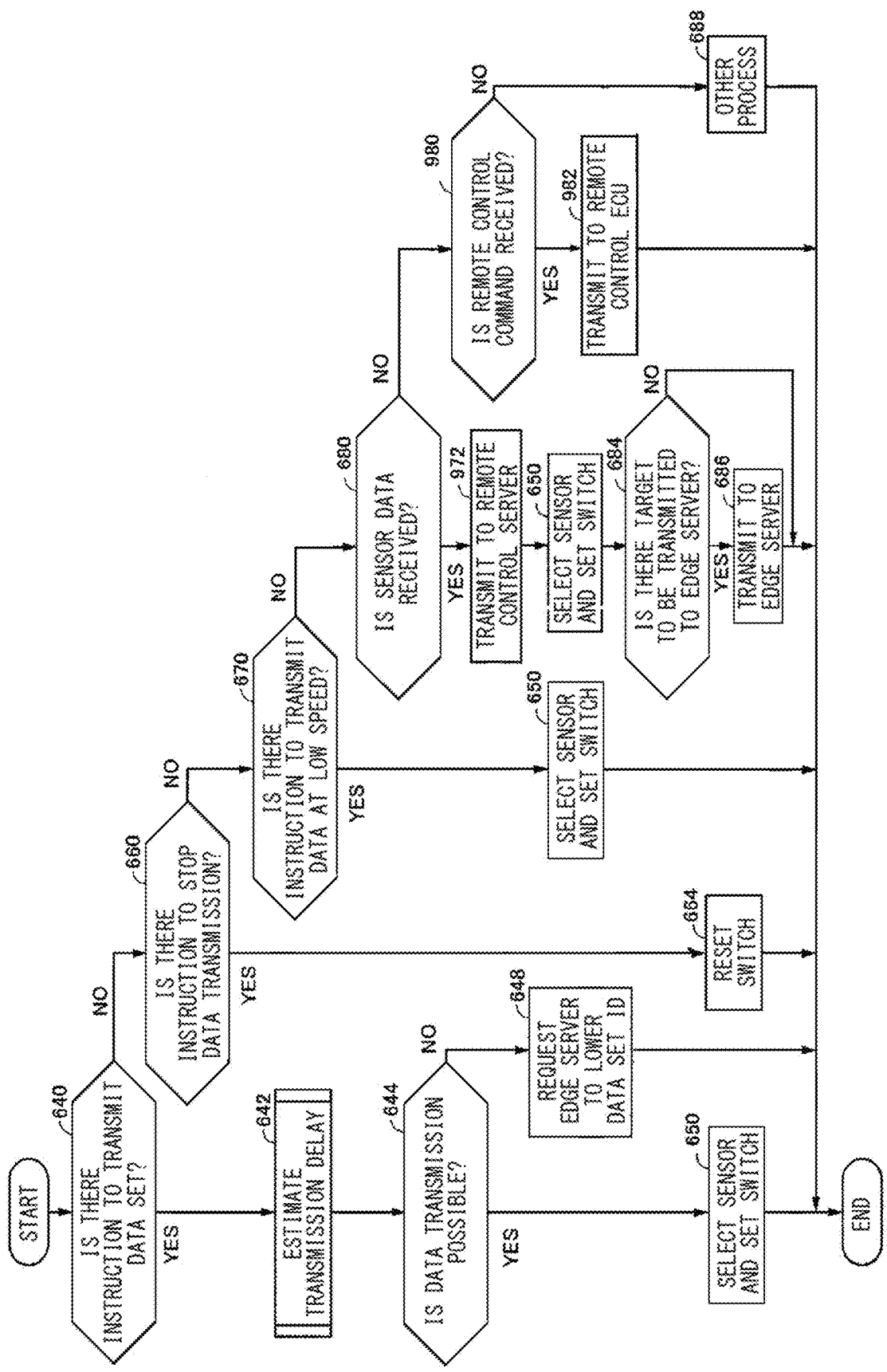
FIG. 22 is a flowchart illustrating a control structure of a program for controlling transmission of sensor data, executed by an in-vehicle device mounted on the vehicle in the traffic assistance system according to the second embodiment.

Referring to FIG. 22, the program differs from the program illustrated in FIG. 16 in that, instead of step 682 in FIG. 16, the program includes a step 972 of transmitting sensor data to the remote control server 910 when the sensor data is received, a step 980 of determining whether the received data is a remote control command from the remote control server 910 in response to the negative determination in step 680 and branching a flow of control, and a step 982 of transmitting the received remote control command to the remote control ECU 930 illustrated in FIG. 21 and terminating the execution of the program when the determination in step 980 is affirmative.

As can be easily understood from a comparison between FIG. 4 and FIG. 21 and FIG. 16 and FIG. 22, the vehicle 916 according to this embodiment operates in the same manner as the vehicle 82 according to the first embodiment except that it operates by remote control instead of automatic driving, and the same effect can be obtained.

In the second embodiment, hardware similar to that described in the first embodiment may be used except for the remote control ECU 930, and a difference from the first embodiment is a part of a control structure of a program executed by the vehicle 916 or the like. As the edge server 128, exactly the same one as that of the first embodiment may be used.

As described above, in the second embodiment, a vehicle that uses a sensor output not for autonomous driving but for remote control can also be used as a target for collecting sensor data. The collection target of the sensor data can be widened, and the quality of the traffic situation bird's-eye view map maintained and managed by the edge server can also be maintained high while the influence on the vehicle having the autonomous driving function is reduced.

The remote control server 910 illustrated in FIG. 20 and FIG. 21 operates based on the sensor data received from the sensor 170 mounted on vehicle 916, and transmits the remote control command to the remote control ECU 930. Any one of the sensor data transmitted to the remote control server 910 is selected by the in-vehicle/out-vehicle cooperation unit 952 and transmitted to the edge server 128. Therefore, the sensor data can be shared between the remote control server 910 and the edge server 128, and the remote control of the vehicle 916 and the execution of the process of the edge server 128 can be efficiently performed.

In the above-described embodiment, the line speed is measured by the in-vehicle/out-vehicle cooperation device, and it is determined whether the sensor data set can be transmitted. However, the present disclosure is not limited to such embodiments. For example, the edge server 128 may transmit the line speed between each vehicle and the edge server 128 estimated from the communication situation map 152 (see FIG. 3) in the area managed by the edge server and the position of each vehicle to the in-vehicle/out-vehicle cooperation device. In this case, the in-vehicle/out-vehicle cooperation device determines whether the sensor data of the sensor data set can be transmitted using the line speed.

In the above embodiment, the edge server 128 further collects the sensor data set tables from each vehicle, designates the identifier of the sensor data set to the candidate vehicle based on the tables, and requests the candidate vehicle to transmit the sensor data. However, the present disclosure is not limited to such embodiments. For example, without the edge server 128 collecting the sensor dataset table, depending on the conditions such as the communication speed for each vehicle, it is conceivable to inquire a data set that can transmit the most sensor data from the designated sensor to the edge server 128. The edge server 128 may select a vehicle that can transmit the most data among the vehicles that have answered.

Furthermore, in the above-described embodiment, the edge server 128 and the vehicle (mainly the in-vehicle/out-vehicle cooperation unit 164) cooperate to determine a sensor data set to be transmitted from the vehicle to the edge server 128. However, the present disclosure is not limited to such an embodiment, and the in-vehicle/out-vehicle cooperation unit 164 may independently determine the sensor data set. For example, in a case where the sensor is a camera, when the image output from the camera is unclear, it is conceivable to stop transmitting the image from the camera to the edge server 128 and transmit an image of another camera capable of acquiring a clear image to the edge server 128. Whether the image is clear may be determined based on, for example, whether the image has many high-frequency components by performing Fourier analysis on the image.

In order for the in-vehicle/out-vehicle cooperation unit 164 to accurately estimate the line speed in the above embodiment, time synchronization by the timer illustrated in FIG. 7 is essential. However, the accuracy of the time synchronization depends on a protocol used for time synchronization and hardware performance of the in-vehicle/out-vehicle cooperation unit 164 and an ECU having a similar configuration. Therefore, it is desirable to set the margin in the calculation of the delay time to be large when the synchronization error is large, and to reduce the margin when the synchronization error is small.

A computer program for causing the in-vehicle/out-vehicle cooperation units 164 and 952 to operate as each function of the in-vehicle/out-vehicle cooperation unit and its constituent elements is written in the ROM 344 at the time of shipment of the in-vehicle/out-vehicle cooperation units 164 and 952 in this embodiment. However, the computer program written in the ROM 344 can be updated via a network as necessary. Furthermore, these computer programs can be updated from a medium such as a compact disk-read only memory (CD-ROM) or a digital versatile disc read only memory (DVD-ROM) by connecting a reading device of a removable storage medium to the in-vehicle device 932. In this case, the CD-ROM, the DVD-ROM, or the like in which the computer program is recorded may also be distributed in the market.

The embodiments disclosed herein are merely examples, and the present disclosure is not limited only to the above-described embodiments. The scope of the present disclosure is defined by each claim of the claims in consideration of the description of the detailed description of the present disclosure, and includes all modifications within the meaning and scope equivalent to the words described therein.

REFERENCE SIGNS LIST 50 real space
52, 150, 225 traffic situation bird's-eye view
70 communication system
82, 84, 520, 522, 524, 914, 916 vehicle
86 pedestrian
88 infrastructure camera
90 traffic signal controller
92, 94, 932 in-vehicle device
96 mobile phone
98, 100 wireless communication device
110, 112, 114 base station
120, 122 metro NW
124, 130 distributed DC
126, 128 edge server
140 core NW
142 core DC
144 core server
152 communication situation map
160, 950 NSW
162, 954 out-vehicle communication device
164, 952 in-vehicle/out-vehicle cooperation unit
170 sensor
172 autonomous driving ECU
174, 960 arrow
180 infrastructure sensor facility
190 infrastructure sensor
192 communication device
210 reception processing unit
212 moving object tracking unit
213 moving object tracking result
214 moving object tracking result storage unit
216 attribute detection unit
217 attribute
218 attribute storage unit
220 vehicle tracking unit
221 vehicle information
222 vehicle information storage unit
224 integrated processing unit
226 traffic situation bird's-eye view map storage unit
228 information transmission unit
230 transmission processing unit
240 high priority area extraction unit
242 sensor priority policy storage unit
244 policy determination unit
246 candidate vehicle selection unit
248 sensor data set table storage unit
250 data set inquiry unit
252 vehicle selection unit
254 inquiry transmission/reception unit
256 line speed information storage unit
258 communication situation map management unit
260 communication situation map storage unit
262 high definition map storage unit
280, 282, 284, 286 sensor unit
288 in-vehicle network
290 TCU
292, 294, 296, 298 network switch
300 first multi-gigabit switch
302 second multi-gigabit switch
320 microprocessor
340 CPU
342 bus
344 ROM
346 RAM
348 DMAC
350 timer
352 input/output I/F
354 interrupt controller
400 on-board sensor information
402 sensor data set table
404 sensor priority policy table
406 high definition map data
408 sensor data storage area
410 packet priority policy table
440, 442, 444, 446 camera
500 target area
510 high-speed communication area
512 intersection
514 building
550, 552, 556, 570, 572, 574, 576, 580, 582, 590, 592, 594, 596, 640, 642, 644, 648, 650, 660, 664, 670, 674, 680, 682, 683, 684, 686, 688, 700, 704, 706, 708, 730, 732, 734, 736, 800, 802, 804, 806, 808, 810, 812, 814, 816, 818, 820, 850, 854, 870, 872, 874, 878, 972, 980, 982 step
554, 578, 702, 852 processing
900 traffic assistance system
910 remote control server
912 Internet
930 remote control ECU

The invention claimed is:

1. An in-vehicle/out-vehicle cooperation device used in a vehicle including a wireless communication device that wirelessly communicates data with an out-vehicle and a plurality of sensors, the in-vehicle/out-vehicle cooperation device comprising:
processing circuitry configured to:
receive sensor data from the plurality of sensors;
estimate a transmission delay time of the sensor data from each of the plurality of sensors to a predetermined device communicable by the wireless communication device, the transmission delay time including a delay time from each of the plurality of sensors to the predetermined device;
estimate a detection range of an infrastructure sensor present in a vicinity of the vehicle;
estimate a detection range of the plurality of sensors;
set a value of sensor data from each sensor such that the smaller the area of the detection range of the sensor overlapping with the detection range of the infrastructure sensor, the larger the value;
select a part of the sensor data based on the transmission delay time; and
transmit the selected part of the sensor data to the predetermined device via the wireless communication device.

2. The in-vehicle/out-vehicle cooperation device according to claim 1, wherein the transmission delay time includes a delay time of the sensor data between ends from each of the plurality of sensors to the predetermined device communicable by the wireless communication device.

3. The in-vehicle/out-vehicle cooperation device according to claim 2, wherein the processing circuitry is configured to:
estimate, for each sensor, a time until the sensor data from the plurality of sensors reaches the processing circuitry;
estimate a processing time required for processing until the sensor data that has reached the processing circuitry is input to the wireless communication device;
estimate a wireless communication delay time required for the sensor data to be transmitted from the wireless communication device to the predetermined device; and
calculate the transmission delay time based on a data amount of each of the plurality of sensors, the time, the processing time, and the wireless communication delay time.

4. The in-vehicle/out-vehicle cooperation device according to claim 1, wherein the processing circuitry is configured to:
determine the value of sensor data based on a state of the vehicle and states of the plurality of sensors; and
select the part of the sensor data based on the transmission delay time and the values.

5. The in-vehicle/out-vehicle cooperation device according to claim 4, wherein the processing circuitry is configured to:
estimate the detection range of the infrastructure sensor present in a vicinity of the vehicle based on a position of the vehicle; and
estimate the detection range of the plurality of sensors based on the position and an attitude of the vehicle.

6. The in-vehicle/out-vehicle cooperation device according to claim 5, wherein the processing circuitry is configured to:
repeatedly update the estimated detection range of the infrastructure sensor present in the vicinity of the vehicle based on the position of the vehicle at predetermined time intervals, and
repeatedly update the value of the sensor data from each sensor based on the position and attitude of the vehicle at a predetermined time interval such that the smaller the area of the sensor overlapping with the updated estimated detection range of the infrastructure sensor, the larger the value.

7. The in-vehicle/out-vehicle cooperation device according to claim 5, wherein
each of the plurality of sensors is classified into any of a plurality of sensor types, and
the processing circuitry is configured to:
estimate the detection range of the infrastructure sensor present in the vicinity of the vehicle for each sensor type of the infrastructure sensor based on the position of the vehicle; and
set the value of sensor data from a sensor belonging to the sensor type among the plurality of sensors such that the smaller the area of the detection range of the sensor overlapping with the detection range of the infrastructure sensor estimated for the sensor type, the larger the value.

8. The in-vehicle/out-vehicle cooperation device according to claim 7, wherein
the vehicle further includes an in-vehicle network for data transmission, and
the processing circuitry is configured to receive sensor data from the plurality of sensors via the in-vehicle network.

9. The in-vehicle/out-vehicle cooperation device according to claim 8, further comprising:
a sensor data set storage configured to store information designating a plurality of sensor data sets along with an identifier of each sensor data set, wherein
the plurality of sensor data sets includes information designating, for each of the plurality of sensor types, a number of sensors selected from the plurality of sensors and a data format related to a data amount of sensor data from the sensors, and
the processing circuitry is configured to:
read, in response to receiving any one of the identifiers from the predetermined device, information of the sensor data set corresponding to the identifier from the sensor data set storage;
select, for each of the plurality of sensor types, sensor data from sensors, a number of which is designated by the information of the sensor data set in descending order of the value based on the information of the sensor data set and the value set for the sensor data from each sensor; and
set the in-vehicle network to transmit the selected sensor data in preference to other sensor data.

10. The in-vehicle/out-vehicle cooperation device according to claim 1, wherein
the vehicle further includes an in-vehicle network for data transmission, and the processing circuitry is configured to receive sensor data from the plurality of sensors via the in-vehicle network.

11. The in-vehicle/out-vehicle cooperation device according to claim 1, wherein
the vehicle further includes a vehicle control device configured to control the vehicle using the sensor data from the plurality of sensors, and
the vehicle control device includes an autonomous driving ECU configured to perform autonomous driving of the vehicle using the sensor data received from the plurality of sensors.

12. The in-vehicle/out-vehicle cooperation device according to claim 1, wherein
the vehicle further includes a vehicle control device that includes a remote control ECU configured to control the vehicle according to a predetermined remote control command, and
the processing circuitry is configured to:
transmit the sensor data received from the plurality of sensors via a network to an external remote control device via the wireless communication device; and
input a remote control command received from the remote control device via the wireless communication device to the remote control ECU.

13. An in-vehicle/out-vehicle cooperation method of cooperating an in-vehicle and an out-vehicle by transmitting sensor data from a plurality of sensors to a predetermined external device in a vehicle including a wireless communication device that wirelessly communicates data with the out-vehicle and the plurality of sensors, the in-vehicle/out-vehicle cooperation method comprising:
receiving sensor data from a plurality of sensors mounted on a vehicle by a computer;
estimating a transmission delay time of the sensor data from each of the plurality of sensors to a predetermined device communicable by the wireless communication device by the computer, the transmission delay time including a delay time from each of the plurality of sensors to the predetermined device;
estimating a detection range of an infrastructure sensor present in a vicinity of the vehicle;
estimating a detection range of the plurality of sensors;
setting a value of sensor data from each sensor such that the smaller the area of the detection range of the sensor overlapping with the detection range of the infrastructure sensor, the larger the value;
selecting a part of the sensor data based on the transmission delay time; and
transmitting the selected sensor data to the predetermined device via the wireless communication device by the computer.

\* \* \* \* \*